United States Patent
Fertig et al.

(10) Patent No.: US 9,026,410 B2
(45) Date of Patent: May 5, 2015

(54) SYSTEM AND METHOD FOR RAPID MANAGEMENT OF LOGIC FORMULAS

(75) Inventors: Kenneth W. Fertig, Palo Alto, CA (US); Sudhakar Y. Reddy, Santa Clara, CA (US); Bruce Riggins, Whittier, CA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 13/422,335

(22) Filed: Mar. 16, 2012

(65) Prior Publication Data

US 2013/0246016 A1 Sep. 19, 2013

(51) Int. Cl.
*G06F 7/60* (2006.01)
*G06F 17/10* (2006.01)
*G06N 5/00* (2006.01)
*G06N 5/02* (2006.01)

(52) U.S. Cl.
CPC ... *G06N 5/00* (2013.01); *G06N 5/02* (2013.01)

(58) Field of Classification Search
CPC ............ G06F 17/5018; G06F 17/5036; G06F 17/5009; G06F 2217/16; G05B 17/02
USPC .......................................................... 703/2
See application file for complete search history.

(56) References Cited

U.S. PATENT DOCUMENTS

2007/0239497 A1 10/2007 Fertig

OTHER PUBLICATIONS

"Optimization of the Quine-McCluskey Method for the Minimization of the Boolean Expressions" Jain et al. Provided in IDS element 1, on Feb. 8, 2014.*

Tarun Kumar Jain et al: "Optimization of the Quine-McCluskey Method for the Minimization of the Boolean Expressions", Autonomic and Autonomous Systems. 2008. ICAS 2008. Fourth International Conference on, IEEE. Piscataway. NJ. USA. Mar. 16, 2008. pp. 165-168, XP031242941, ISBN: 978-0-7695-3093-2.

Richard L. Rude 11 : "Logic Synthesis for V LSI Design," Thesis Electronic Research Laboratory of College of Engineering, University of California, Berkeley, Apr. 26, 1989, XP055098374.

Ang C C et al: "Constraint networks: a 1-15 v survey", Systems, Man, and Cybernetics, 1997. Computational Cybernetics and Sim Ulation., 1997 IEEE International Conference on Orlando, FL, USA Oct. 12-15, 1997, New York, NY, USA, IEEE, US, vol. 2, Oct. 12, 1997, pp. 1930-1935, XP010249673, DOC: 10.1109/ICSMC.1997.638351 ISBN: 978-0-7803-4053-4.

Yvijay Ganesh et al: "A Decision Procedure 1-15 for Bit-Vectors and Arrays", Jul. 3, 2007. Computer Aided Verification; [Lecture Notes in Computer Science]. Springer Berlin Heidelberg, Berlin, Heidelberg, pp. 519-531, XP019064494, ISBN: 978-3-540-73367-6.

(Continued)

*Primary Examiner* — Saif Alhija

(57) ABSTRACT

A method for simplifying a complex well-formed formula (WFF) may include receiving, in a formula processor, an input WFF and converting the input WFF into an initial bit array. The method may further include simplifying the initial bit array into a simplified bit array by removing predicates from the initial bit array not necessary to represent the input WFF. The method may include converting the simplified bit array into a return WFF in either a conjunctive normal form or a disjunctive normal form.

20 Claims, 18 Drawing Sheets

(56) References Cited

OTHER PUBLICATIONS

Reddy et al., "Constrained Exploration of Trade Spaces", 2006.
Rudell, Richard L., "Multiple-Valued Logic Minimization for PLA Synthesis," University of California—Berkeley, Electronics Research Laboratory, Electrical Engineering and Computer Science Department, Memorandum No. UCB/ERL M86/65, Jun. 5, 1986.
Wikipedia, "Karnaugh map," available at <http://en.wikipedia.org/wiki/Karnaugh_map>, last visited Jan. 26, 2015.
Wikipedia, "Quine-McCluskey algorithm," available at <http://en.wikipedia.org/wiki/Quine-McCluskey_algorithm>, last visited Jan. 26, 2015.
University of Missouri—Kansas City, "Simplification of Boolean Functions," available at <http://sce2.umkc.edu/csee/hieberm/281_new/lectures/simplification/simplification.html>, last visited Jan. 26, 2015.

* cited by examiner

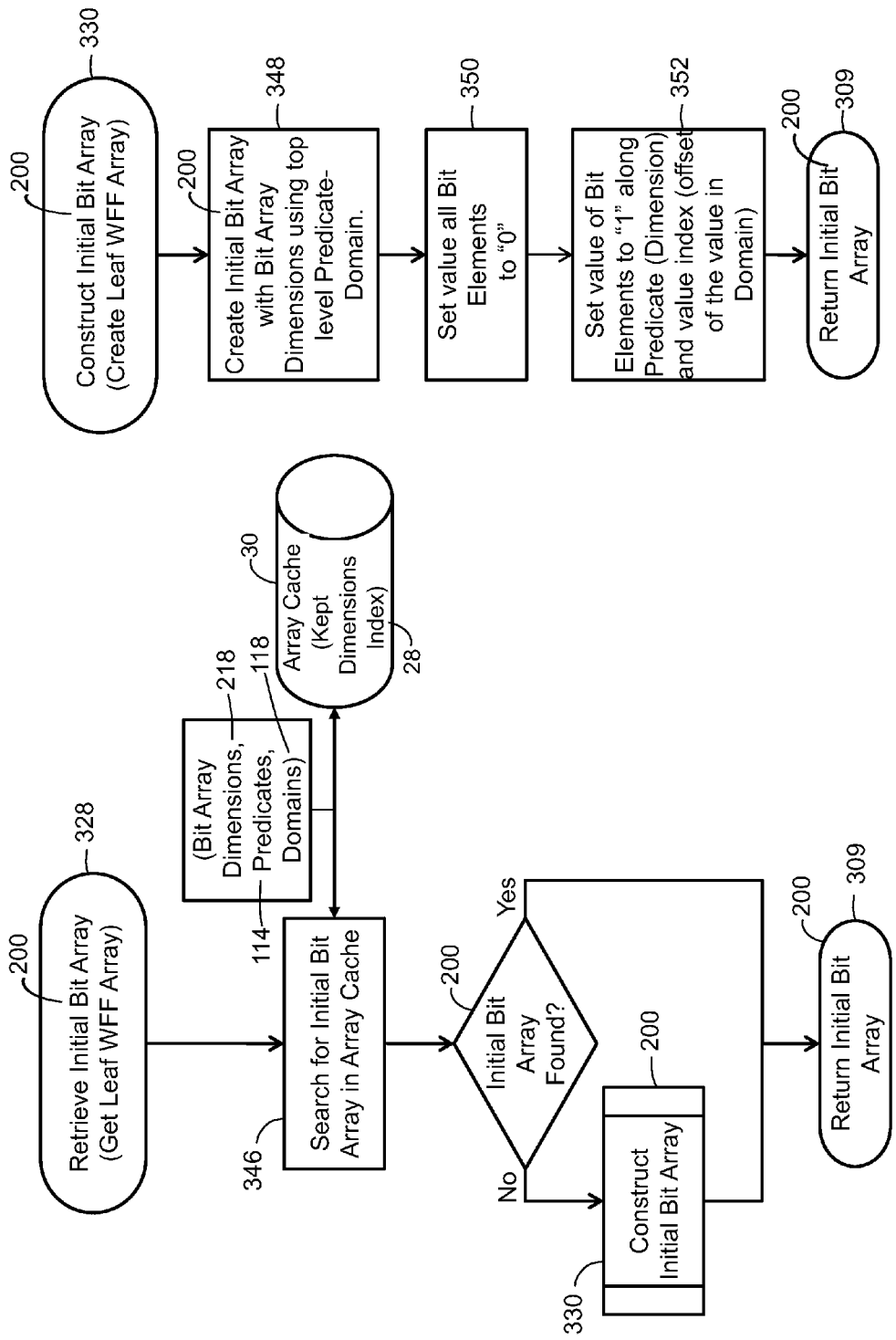

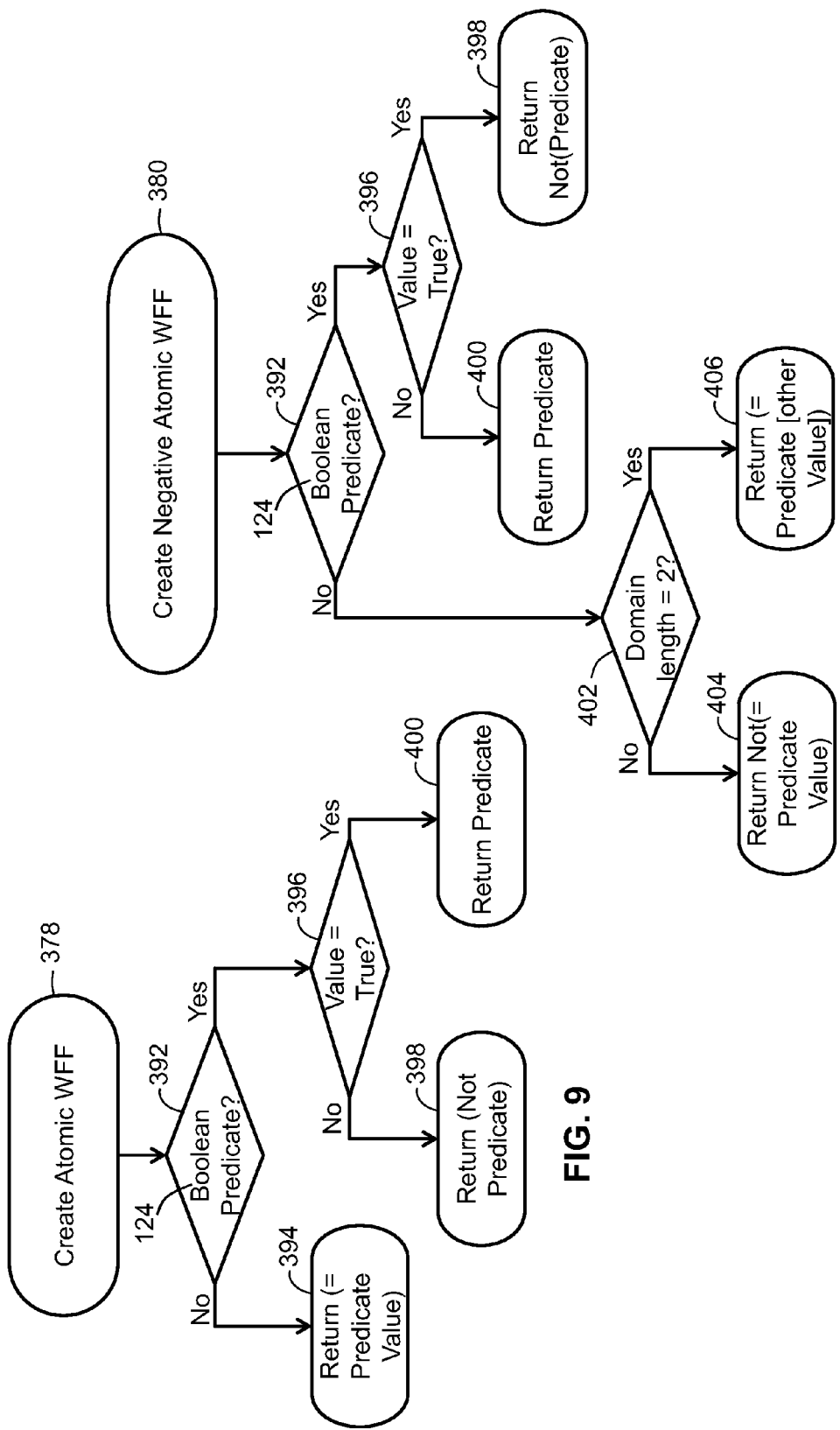

Method: wff_to_array (wff_in)
1. sorted_predicates = Canonical sort of predicates in wff_in
2. domains = List of domains of each predicate in the order of sorted_predicates. For Boolean predicates, this is the special domain {"TRUE", "FALSE"}
3. dimensions = List of integers, the j'th one being the length of the j'th domain.
4. Initialize *array-cache* to empty for special caching of arrays for reuse to control extensive memory use.
5. Set bit-array = wff_to_array_internal(wff_in, sorted_predicates, domains, dimensions)
6. Return bit-array and predicates as multiple values

Method: wff_to_array_internal ( wff_in, predicates, domains, dimensions)
1. Atomic True or False WFF or Boolean Predicate WFF:
    a. If wff_in = True, return zero dimensional array with specified initial bit element of 1. In LISP, this is #0A1
    b. If wff_in = False, return zero dimensional bit array with specified initial bit element of 0. In LISP, this is #0A0
    c. If wff_in is a single Boolean predicate,
        i. Convert single Boolean WFF to look like an equality predicate for processing by the wff_1_to_array method. Set boolean_wff to (= wff_in "TRUE")
        ii. Return wff_to_array_internal ( boolean_wff, predicates, domains, dimension)
    d. Else, go to 2.
2. Equality predicate or a compound WFF. Treat the following cases in order depending upon the value of operator, which is set to return value of Operator(wff_in)
    a. If operator is "=", this is an equality predicate; do the following, else go to b:
        i. Set pred_index to return value of Position ( Predicate(wff_in), predicates)
        ii. Set domain to return value of Element ( domains, pred_index)
        iii. Set value_index to return value of Position ( PredicateValue(wff_in),domain)
        iv. Return GetLeafWffArray(dimensions, pred_index, value_index)
    b. If operator is "Not", do the following, else go to c.
        i. Set wff_2 to Arg1(wff_in)
        ii. If wff_2 is Boolean predicate, do the following, else go to iii.
            1. Set pred_index to return value of Position(wff_2, predicates)
            2. Set domain to return value of Element(domains, pred_index)
            3. value_index to return value of Position ( "FALSE", domain)
            4. Return GetLeafWffArray(dimensions, pred_index, value_index)
        iii. At this point we have a negated compound WFF. Process the arguments and negate the result.
            Set array to return value of wff_to_array_internal (arg1, predicates, domains, dimensions)
        iv. Return BitNot(array)
    c. Non-negated compound statement headed by And or Or. Process the results recursively and combine the answers using the appropriate bit array combiner.
        i. For each wff[i] in the list of WFF's returned by Args(wff_in), collect the return value of wff_to_array_internal(wff[i], predicates, domains, dimensions) into the list results
        ii. If operator = AND, set combined_array to the combination of the bit arrays in results using BitAnd, else operator must be OR, so set combined_array to the combination the bit arrays in results using BitOr. Return the combined_array.

Method: GetLeafWffArray(dimensions, pred_index, value_index)
1. Return the array in **\*array-cache\* with key (pred_index, value_index)** if it exists. Otherwise, go to 2
2. Set array to MakeBitArray( dimensions, InitialElements=0)
3. Set elements of array by calling the recursive function SetArrayDimensionIndex( array, pred_index, value_index, dimensions, current_dimension, starting_indices ), where
   set_dimension is set to pred_index
   index is set to value_index
   current_dimension is initialized to 1
   starting_indices is initialized to the empty list
4. Add array to **\*array-cache\* with key (pred_index, value_index)**
5. Return array.

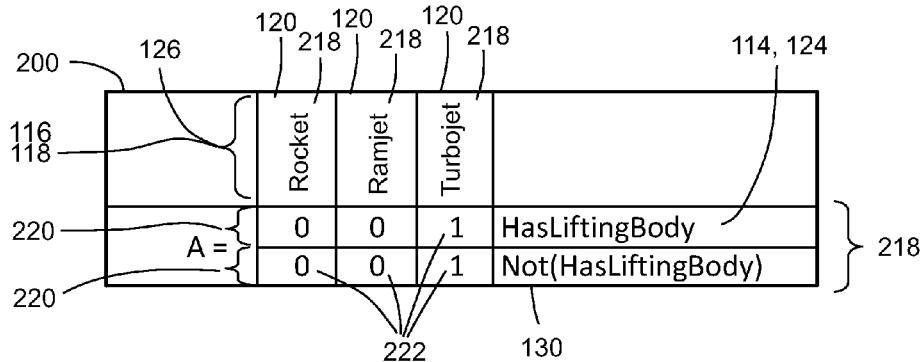

FIG. 16

Method: SetArrayDimensionIndex (bit_array, set_dimension, index, dimensions, current_dimension, indices)
1. Set this_dimension_size to Elements(dimensions, current_dimension)
2. If this_dimension does not equal Length(dimensions), then go to 3, else go to 2.a.
    a. We are now processing the last dimension of the array. If current_dimension does not equal set_dimension, then go to 2.b. Otherwise, the last dimension is the same as set_dimension and we are at the leaf of recursive calls that increment indices.
       Set the appropriate element of bit_array with the call SetBit(array, indices, 1) and return from SetArrayDimensionIndex.
    b. We are at the last dimension after already passing the set_dimension. In this case, set all worlds associated with current_dimension. That is, for k from 1 to this_dimension_size, call SetBit(array, Append(indices, {k}), 1) and then return from SetArrayDimensionIndex.
3. If current_dimension does not equal set_dimension, go to 4; otherwise, we are at the set_dimension and no looping over all the domain values for current_dimension is appropriate. We need to set the elements associated with index only. Thus, at this point we just append index to the growing indices list, increment current_dimension to the next level, and modify bit_array with the recursive call:
    SetArrayDimensionIndex (bit_array, set_dimension, index, dimensions, (1+ current_dimension), Append(indices, {index}), after which we return form this call to SetArrayDimensionIndex.
4. At this point, current_dimension does not equal set_dimension and we are not at the last dimension. Here we recursively call SetArrayDimensionIndex with indices augmented with each value for the current_dimension and with a new current_dimension incremented to the next level. Thus, for each k from 1 to this_dimension_size, we recursively call as follows:
    SetArrayDimensionIndex (bit_array, set_dimension, index, dimensions, (1+ current_dimension), Append(indices, {k})
    We then return from SetArrayDimensionIndex with the modified bit_array.

FIG. 17

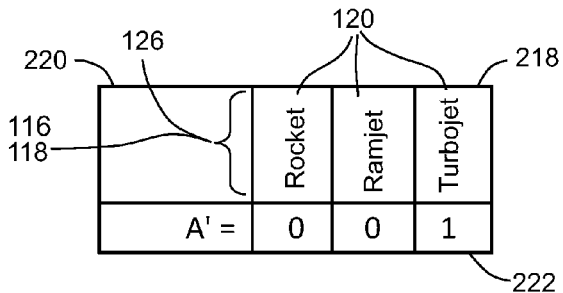

Method: SimplifyArray(bit_array, [(dimension-slice = 1), (axis = 1),
(dimensions-remaining = {})])
1. If dimension-slice is less than (array-rank bit-array), go to 2. Else, we are processing the last axis of the input bit-array. Collapse along this axis if possible and return the result along with the list of axes that were not collapsed by executing the following:
    a. Set updated-array = CollapseIfPossible(bit-array, dimension-slice)
    b. Unless updated-array was collapsed from bit-array in this last call, store axis in dimensions-remaining.
    c. Return from SimplifyArray: updated-array and dimensions-remaining.
2. We are processing an axis of bit-array less than the last axis. See if we can collapse along this axis, update internal variables, and recur to the next axis by executing the following:
    a. Set updated-array = CollapseIfPossible(bit-array, dimension-slice).
    b. Unless updated-array was collapsed from bit-array in this last call, do the following:
        i. store axis in dimensions-remaining
        ii. increment dimension-slice
    c. Increment axis.
    d. Recur to next dimension-slice by calling
        SimplifyArray(updated-array, dimension-slice, axis, dimensions-remaining)

Method: ArrayToWff(bit_array_in, predicates, domains)
1. ones = count the "one" bits in the array
2. If ones < half the total number of bits in the array, then wff = ArrayToDNF(bit_array_in, predicates_in, domains_in)
3. Else, wff = ArrayToNotDNF(bit_array_in, predicates_in, domains_in)
4. Return wff

Method: ArrayToDNF(bit_array_in, predicates, domains)
1. npred = number of items in predicates
2. If npred > 1, then
   a. For each "1" bit in bit_array_in, collect the following:
      i. For each predicate/domain value pair associated with this bit array position
         1. Create an atomic wff from the predicate and domain value
      ii. Create a conjunction, wff1, containing each wff created in 2.a.i.
   b. Create a disjunction, wff2, containing each wff1 created in 2.a.
   c. Return wff2
3. If npred = 1, then
   a. For each "1" bit in bit_array_in, collect the following:
      i. Create an atomic wff from the predicate and domain value associated with this bit array position
   b. Create a disjunction, wff1, containing each wff created in 2.a.
   c. Return wff1
4. If npred = 0, then
   a. If bit_array_in = 1, then return T
   b. Else return Nil

Method: ArrayToNotDNF(bit_array_in, predicates, domains)   (Not DNF = CNF)
1. npred = number of items in predicates
2. If npred > 1, then
    a. For each "0" bit in bit_array_in, collect the following:
        i. For each predicate/domain value pair associated with this bit array position
            1. Create a negative atomic wff (eg. Not(= predicate value)) from the predicate and domain value
        ii. Create a disjunction, wff1, containing each wff created in 2.a.i.
    b. Create a conjunction, wff2, containing each wff1 created in 2.a.
    c. Return wff2
3. If npred = 1, then
    a. For each "0" bit in bit_array_in, collect the following:
        i. Create a negative atomic wff (eg. Not(= predicate value)) from the predicate and domain value associated with this bit array position
    b. Create a conjunction, wff1, containing each wff created in 2.a.
    c. Return wff1
4. If npred = 0, then
    a. If bit_array_in = 1, then return T
    b. Else return Nil

SYSTEM AND METHOD FOR RAPID MANAGEMENT OF LOGIC FORMULAS

The present disclosure relates generally to the manipulation of propositional logic formulas or well-formed formulas.

BACKGROUND

The conceptual design of a vehicle such as an aircraft or a space launch vehicle typically involves a set of design tradeoff studies or trade studies wherein numerous system configurations and criteria may be considered. In order to arrive at an optimal design, it is desirable to evaluate a wide variety of candidate design concepts from the standpoint of vehicle performance, cost, reliability, and a variety of other factors across multiple disciplines. The evaluation of candidate design concepts may be implemented in a computational procedure such as in a constraint network wherein, as known in the art, a mathematical relationship between several variables in the constraint network allows for the computation of the value of any one of the variables given the values of the relevant independent variables, as determined by the constraint network. In design trade studies, the evaluation of candidate design concepts may involve large quantities of algebraic equations representing constraints among design, performance, and cost variables.

In the classical implementation of a constraint network for trade study applications, the set of algebraic equations is static such that every equation is satisfied all the time. In addition, alternative computational methods are embedded in selected equations such as in the following representation for determining the aerodynamic drag of an aircraft:

dragPlane=If(CanardIsPresent,dragBody_CanardAt-
      tached(FuselageSize)+dragCanard(CanardSize),
      dragBody_NoCanard(FuselageSize))

Unfortunately, embedding computational methods in equations such as in the above-noted representation can be cumbersome for a modeler of complex systems involving many different configurations. Furthermore, embedding computational methods in equations may prevent the performance of certain types of trade studies that require the reversal of the computational flow.

An alternative to embedding computational methods in equations is to make the applicability of any given equation dependent upon the computational state determined by the same constraint network. An important property of constraint network modeling is the separation of computational planning (i.e., determining the ordered sequence of computational steps, or a computational path through the network, during the performance of a given trade study) from the numerical solution of the constraint sets in the computational path. Such separation of planning of computational paths is essential for providing a system designer with relatively rapid feedback during a trade study. This, in turn, allows the system designer to explore a wide variety of design spaces during a trade study.

In the case where the applicability of each equation is not static and is instead data-dependent, an effective technique for modeling such data dependence is to attach to each equation a propositional form, or a well-formed formula (WFF), which depends upon the data in the network, and which, if such WFF evaluates to true, means that the equation is applicable in the given situation. In this regard, each WFF has a truth value defining a set of worlds where the WFF is true.

The computational plan in a data-dependent network may also be modeled as an ordered sequence of computational steps. In such an arrangement, each computational step is associated with a propositional form or a WFF which depends upon the data in the network and upon the results computed in the previous computational steps, and which, if the WFF evaluates to true, means that the computational step is evaluated in the given situation. The WFFs associated with each computational step may be obtained by different combinations of union, intersection, and difference operators to the WFFs associated with the equations that need to be solved. Such WFFs can become highly complex, depending upon which variables in the constraint network are independent, and require rapid manipulation and combination of such propositional WFFs. The WFFs obtained through combinations of other WFFs require simplification for efficient computation during trade studies. In this regard, leaving combinations of WFFs in an un-simplified state may result in exploding memory size as the WFFs are further combined in relatively large networks involving thousands of equations. Furthermore, when a WFF simplifies to a universally false WFF, the computational plan generation procedure can prune unneeded branches of a constraint network and thereby produce compact and efficient computational plans.

Such WFF simplification process may be extremely computationally intensive when applied to logic formulas having a large quantity of predicates over finite but large domains. The classical algorithms for determining the conjunctive normal forms of a WFF or the disjunctive normal forms of a WFF are inadequate to provide the system designer with computational results in a relatively short period of time (e.g., several minutes). The simplification of WFFs is preferably performed as rapidly as possible in order to reduce computational time and increase the amount of time available to a system designer to consider and investigate different design trades. A reduction in the amount of time for simplifying well-formed formulas may additionally provide a system designer with the capability to investigate larger and more complex design spaces.

For example, in the conceptual design of a hypersonic vehicle, a constraint management planning algorithm is required to simplify many WFFs containing numerous references to a large quantity of predicates during the planning of one of many desired trade studies. An example WFF may have only 10 to 15 predicates with each predicate having two to 20 possible values. Such WFFs may syntactically refer to the same predicates 5 to 10 times with a depth on a similar scale (e.g., And(Or(And Or(P1=−p11, P2=p21 . . . ) . . . Or(And(P1=p13, Or(Not(P1=p13) . . . )))) etc. Unfortunately, the simplification of such WFFs to a conjunctive normal form or a disjunctive normal form using classical algorithms requires 10 to 30 minutes of computer time in one implementation. The relatively long period of computer time for simplifying WFFs using classical algorithms directly detracts from the time available to a designer for considering and investigating different design trades.

As can be seen, there exists a need in the art for a system and method for reducing the amount of time required to simplify well-formed logic formulas in a logic-dependent system such as in a constraint network.

BRIEF SUMMARY

The above-noted needs associated with simplifying logic formulas in logic-dependent systems are addressed and alleviated by the present disclosure which, in an embodiment, provides a method for simplifying a well-formed formula (WFF) that may support the process of computational planning in a constraint network. In an embodiment, the method may include the step of receiving, in a formula processor, an input well-formed formula (WFF). The method may further include converting, with a formula converter, the input WFF into an initial bit array. In addition, the method may include simplifying, with a bit array simplifier, the initial bit array into a simplified bit array by removing predicates from the initial bit array not necessary to represent the input WFF. The simplified bit array may be converted into a return WFF by a bit array converter. The method may include returning, with the formula processor, the return WFF.

In a further embodiment, disclosed is a method for supporting rapid design constraint formula computation including the steps of processing with a classical processor at least one input WFF of a data-dependent constraint management system using one or more classical algorithms to generate a resultant WFF within a predetermined period of time. The method may further include communicating the resultant WFF or an absence thereof to the formula processor. Additionally, the method may include converting, with a formula converter, the input WFF into an initial bit array. In addition, the method may include simplifying, with a bit array simplifier, the initial bit array into a simplified bit array by removing predicates from the initial bit array not necessary to represent the input WFF. The simplified bit array may be converted into a return WFF by a bit array converter. The method may include returning, with the formula processor, the return WFF.

Also disclosed is a system for supporting rapid design constraint formula computation. The system may include a classical processor that may be configured to process an input WFF using one or more classical algorithms to generate a resultant WFF within a predetermined period of time. The classical processor may be configured to communicate the resultant WFF or an absence of the resultant WFF external to the processor. The system may include a formula processor coupled to the classical processor and being configured to convert an input WFF into an initial bit array, simplify the initial bit array into a simplified bit array by removing predicates from the initial bit array not necessary to represent the input WFF, and convert the simplified bit array into a return WFF.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 3 is a flow diagram illustrating one or more operations that may be included in a method for retrieving an initial bit array from an array cache;

FIG. 4 is a flow diagram illustrating one or more operations that may be included in a method for constructing an initial bit array;

FIG. 9 is a flow diagram illustrating one or more operations that may be included in a method for creating an atomic WFF;

FIG. 10 is a flow diagram illustrating one or more operations that may be included in a method for creating a negative atomic WFF;

FIG. 13 is a pseudo-code listing of a top-level routine for converting an input WFF to an initial bit array according to the method illustrated in FIGS. 2A-2B;

FIG. 14 is a pseudo-code listing of a routine for implementing the method shown in FIGS. 2A-2B of converting an input WFF to an initial bit array;

FIG. 15 is a pseudo-code listing of a routine for implementing the method shown in FIG. 3 of retrieving an initial bit array from an array cache;

FIG. 16 is an illustration of an embodiment of an initial bit array that may be constructed using the method illustrated in FIG. 4 and wherein the method may be performed using the routine represented by the pseudo-code listing illustrated in FIGS. 15 and 17;

FIG. 17 is a pseudo-code listing of a routine that may be implemented in a method shown in FIG. 4 of constructing an initial bit array;

FIG. 18 is an illustration of a simplified version of the initial bit array of FIG. 15 and wherein the simplified bit array may be simplified using the method shown in FIG. 5;

FIG. 19 is a pseudo-code listing of a routine that may be implemented in the method shown in FIG. 5 of simplifying an initial bit array;

FIG. 20 is a pseudo-code listing of a routine for implementing the method shown in FIG. 6 of converting a simplified bit array to a return WFF;

FIG. 21 is a pseudo-code listing of a routine for implementing the method shown in FIG. 7 of converting the simplified bit array to a return WFF in disjunctive normal form;

FIG. 22 is a pseudo-code listing of a routine for implementing the method shown in FIG. 8 of converting the simplified bit array to a return WFF in conjunctive normal form.

DETAILED DESCRIPTION

Figure 1:
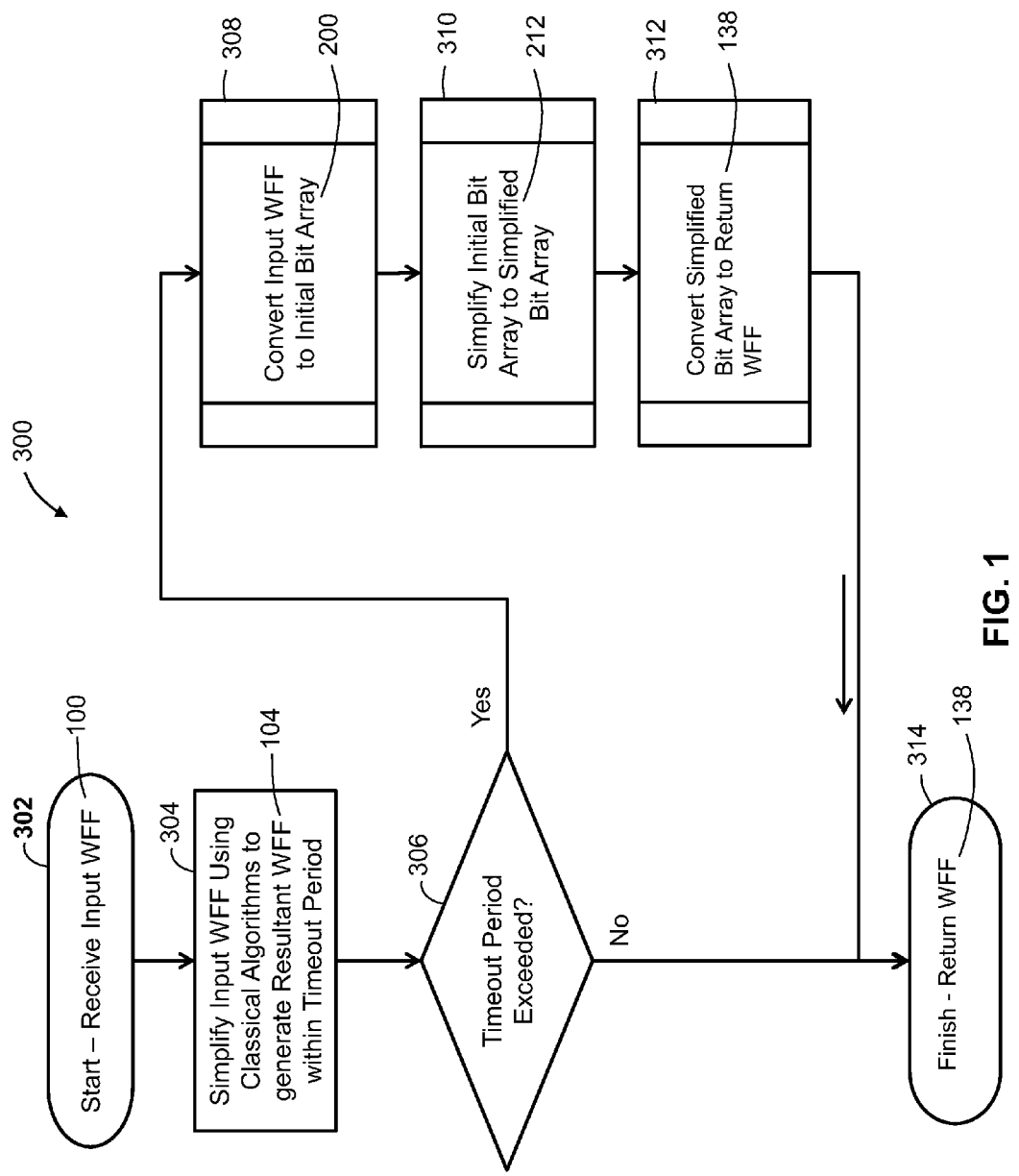
FIG. 1 is a flow diagram illustrating a method of simplifying an input well-formed formula (WFF) by first attempting to simplify the input WFF using classical algorithms within a timeout period and, if the timeout period is exceeded, converting the input WFF into an initial bit array, simplifying the initial bit array, and converting the simplified bit array into a return WFF.
Figure 2A:
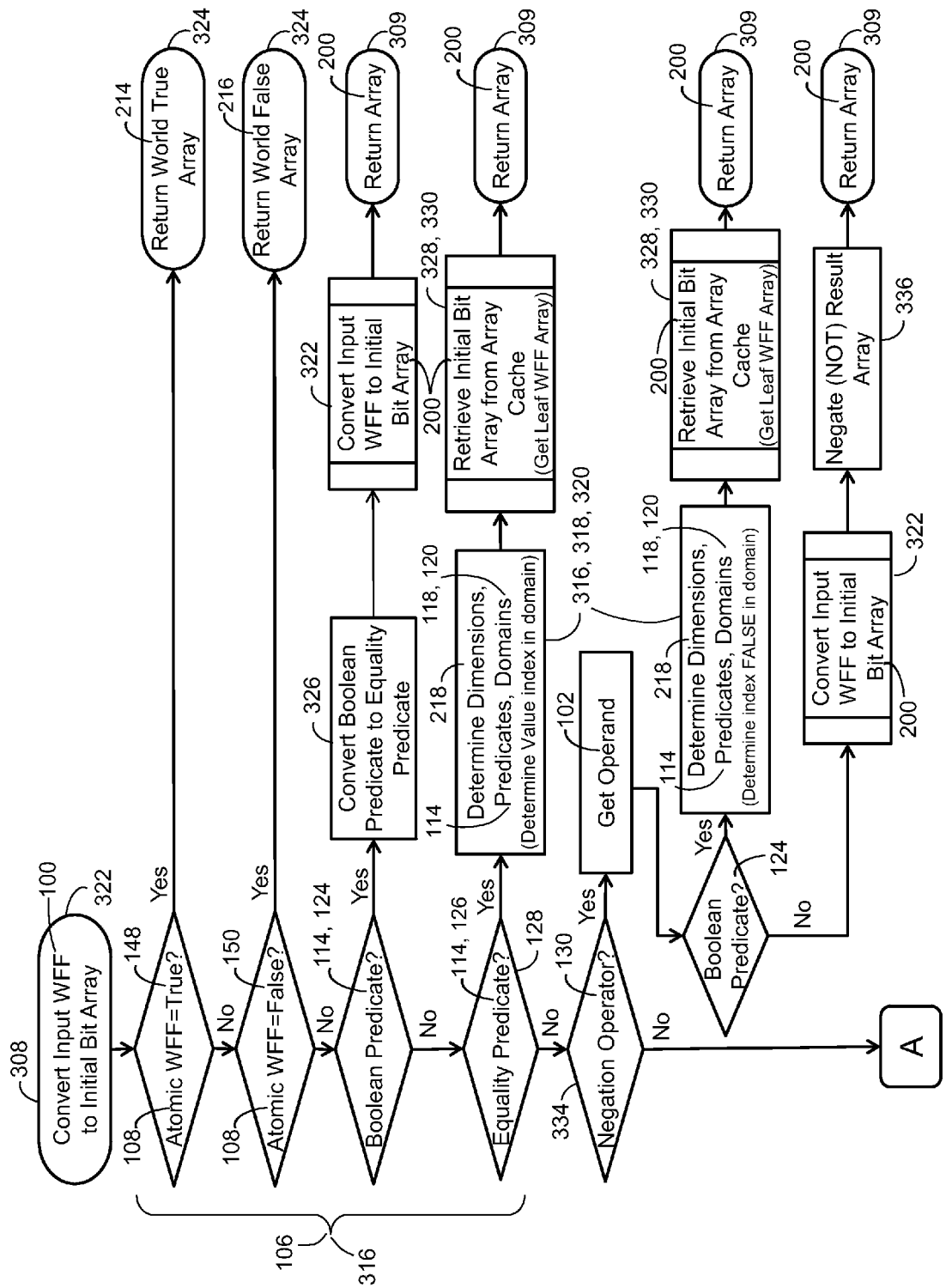
FIGS. 2A-2B are flow diagrams illustrating one or more operations that may be included in a method for converting the input WFF into the initial bit array.
Figure 2B:
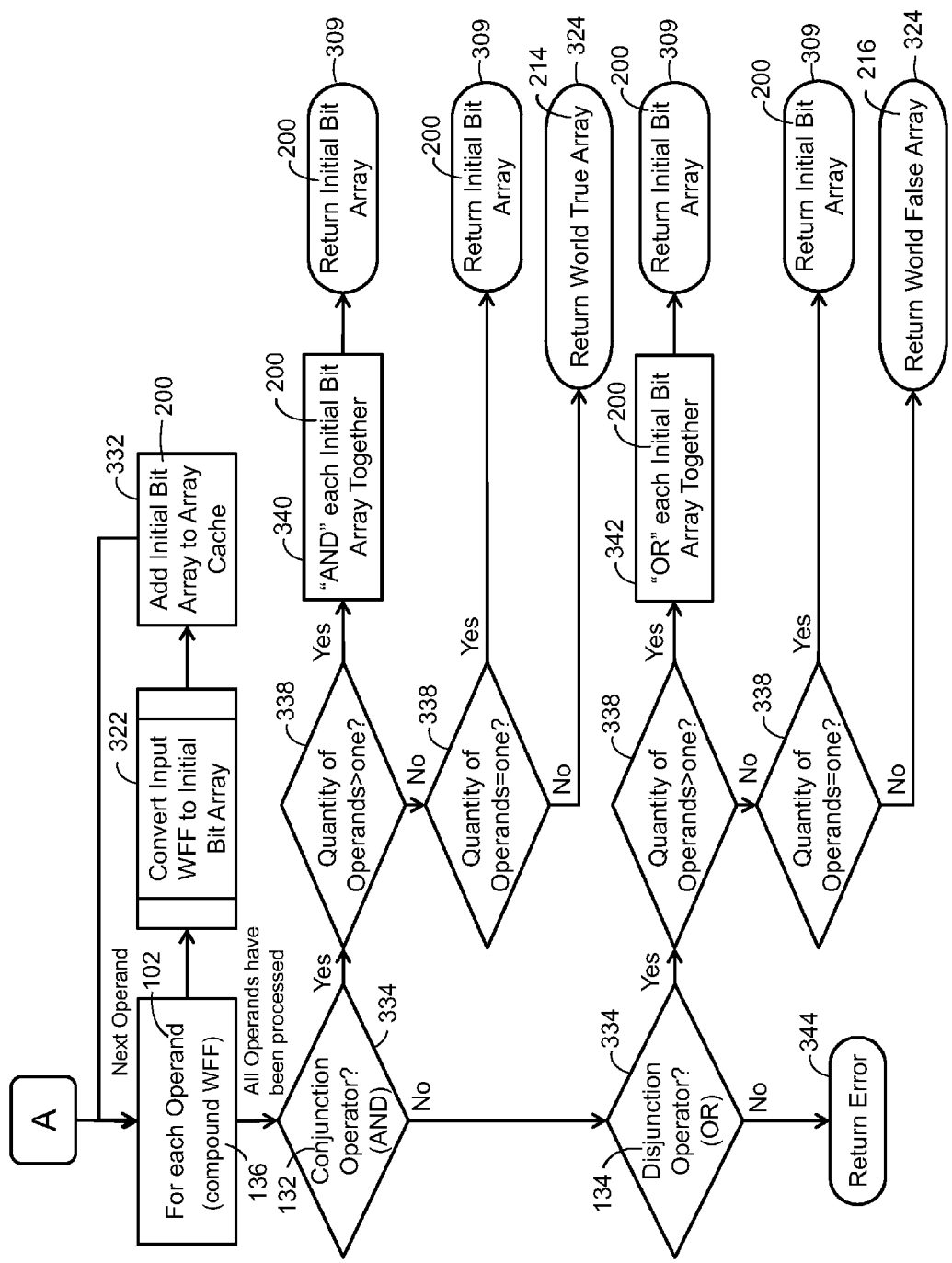
Figure 6:
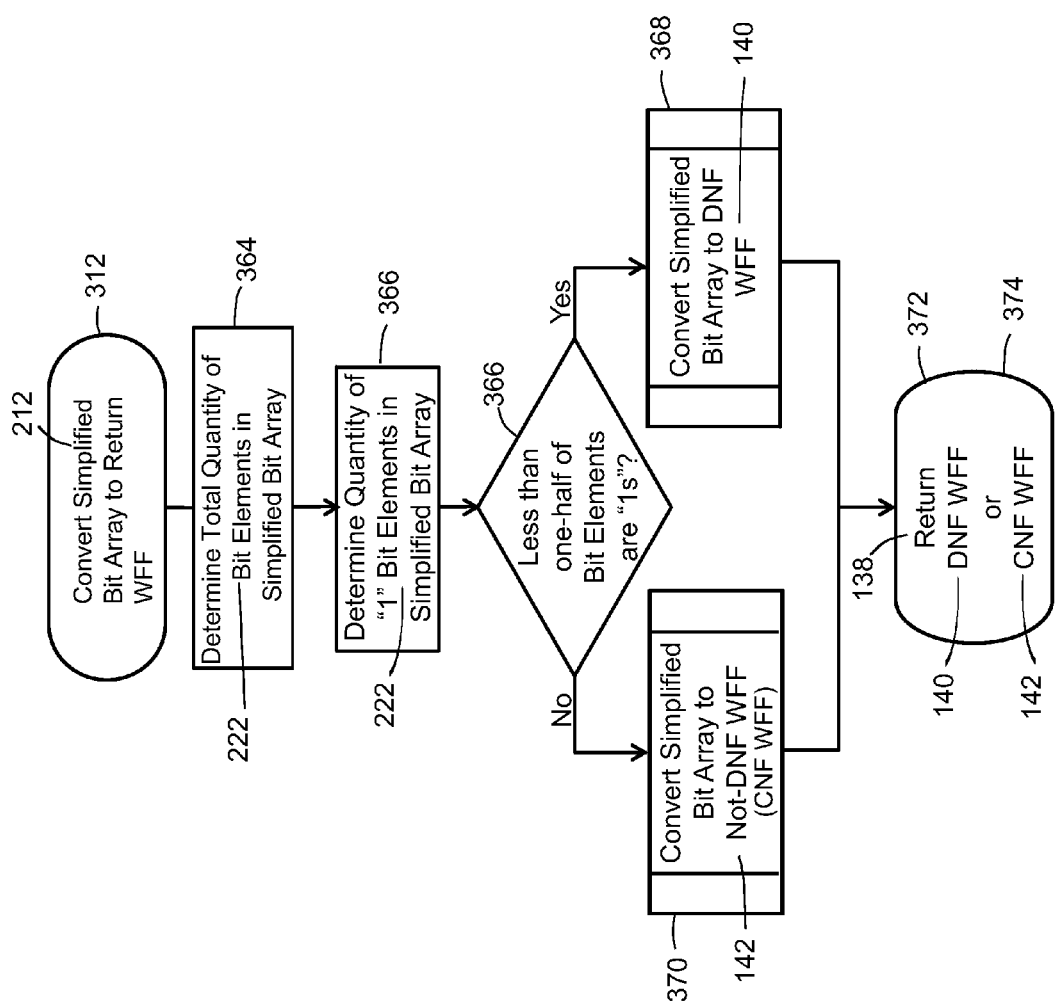
FIG. 6 is a flow diagram illustrating one or more operations that may be included in a method for converting the simplified bit array to a return WFF.
Figure 23:
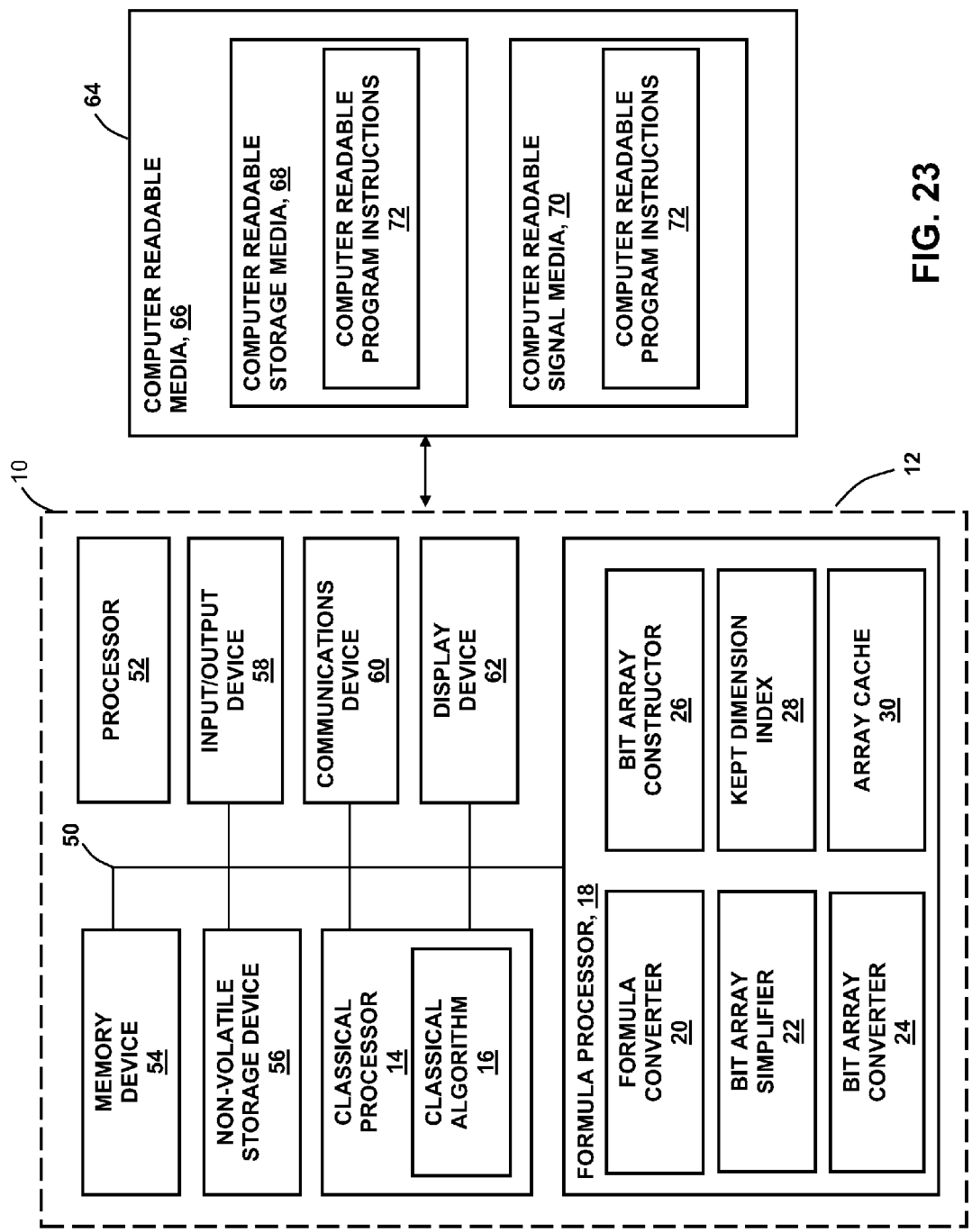
FIG. 23 is a block diagram of an embodiment of a processor-based system for implementing one or more operations of a method for simplifying an input WFF.

Referring now to the drawings wherein the showings are for purposes of illustrating various embodiments of the present disclosure, shown in FIG. 1 is an illustration of a method 300 of simplifying a complex propositional logic formula or complex well-formed formula (WFF) 100 such as for supporting design constraint formula computation in a constraint management system 12 (FIG. 23). In the present disclosure, the input WFF 100 combines Boolean variables or predicates 124 (FIG. 11) and equality predicates 126 (FIG. 11) with negation, conjunction, and disjunction operators 130, 132, 134 (FIGS. 2A-2B). The system (FIG. 23) and method 300 converts an input WFF 100 into an initial bit array 200 (FIG. 1) representation of the input WFF 100 in Step 308 (FIG. 1). In Step 310 (FIG. 1), the initial bit array 200 is converted to a simplified bit array 212 to remove predicates 114 (FIG. 11) that are not necessary to represent the input WFF 100. In Step 312, the simplified bit array 212 is then converted into a return WFF 138 (FIG. 6) in minimal canonical form comprising disjunctive normal form (DNF) 140 (FIG. 6) and/or conjunctive normal form (CNF) 142 (FIG. 6). The return WFF 138 may be returned by the formula processor 18 (FIG. 23) in Step 314.

The technical effect of implementing the system 10 (FIG. 23) and method 300 (FIG. 1) such as in a data dependent constraint management system 12 (FIG. 23) is a significant reduction in the amount of time required to simplify the results of the union, intersection, and difference operations of well-formed formulas. In addition, implementation of the method in a data-dependent constraint management system may significantly reduce the amount of time required for model-loading and trade-execution. For example, the inventors have observed an implementation of the method described in the present disclosure wherein the amount of time required to compute specific trade studies for advanced hypersonic vehicle design has been reduced from hours to minutes. The reduction in processing time provides the technical effect of allowing a designer to explore larger and more complex design spaces in an integrated manner. As indicated above, simplification of the input WFF may reduce branching when traversing nodes of a data-dependent constraint network during a trade study. By reducing branching, and reducing the amount of time required for simplification of complex WFFs, the system and method provides the technical effect of allowing a designer to rapidly trade off a wide range of alternative system configurations, each of which may include different analytical models for evaluating performance and/or cost.

It should be noted that while the WFFs associated with any individual equation or variable node in a constraint network may be simple, such WFFs are combined along the computational paths for a given trade study, or a given set of assumed independent variables in the network using union and intersection operations. For example, if variables represented by Node1*a* with WFF1*a* and Node1*b* with WFF1*b* are complementary predecessors of a relation represented by Node2 with WFF2 in a computational path, then Node2 will be executed in the set of worlds represented by the disjunctive normal form: Or(And(WFF1*a*, WFF2), And(WFF1*b*, WFF2)), or, more simply, the conjunctive normal form: And(Or(WFF1*a*, WFF1*b*), WFF2). The computational paths may involve hundreds to thousands of steps such that a combinatorial increase in complexity may occur.

Although described in the context of data-dependent constraint management systems 12, the system and methods disclosed herein may advantageously be implemented in any application requiring manipulation of propositional logic formulas including applications requiring manipulation of lengthy combinations of simple WFFs. It should also be noted that although the present disclosure describes the system and methods in the context of manipulating WFFs as list constructs in languages such as Allegro Common Lisp, commercially available from Franz, Inc., of Oakland, Calif., the system and method may be operative to manipulate WFFs in alternative forms. For example, the system and method may be operative for manipulating WFFs represented as objects providing improved efficiency in simplifying such WFFs.

In the present disclosure, input WFFs 100 (FIG. 1) may be represented as lists wherein the first element in the list may be a top level operator of the input WFF 100. An input WFF 100, in the context of the present disclosure, may comprise one of the following:

1. The symbol T or F (representing True and False, respectively).
2. A predicate, which is either:
   a. A Boolean predicate (B1, B2, ...);
   b. An equality predicate (P1, P2, ...) each over its own finite domains (D(P1), D(P2), ...);
3. The negation operator, Not, applied to a WFF, as in Not(WFF);
4. The conjunction operator, And, applied to zero or more WFFs as in And(WFF1, WFF2, ...);
5. The disjunction operator, Or, applied to zero or more WFFs, as in Or(WFF1, WFF2, ...).

Note that by definition, And( )=T and Or( )=F. WFFs that contain one or more of the logical operators "And", "Or", or "Not" are referred to as "compound" WFFs herein. All other WFFs are referred to as "atomic" WFFs. Atomic WFFs include the symbols T and F, which are referred to as "atomic True" and "atomic False" WFFs herein. Atomic WFFs also include WFFs comprising a single Boolean predicate as well as "equality" WFFs formed by equating a predicate to an element in its (finite) domain, such as "EngineType=Rocket", wherein EngineType is the predicate and can have values such as "Rocket", "Ramjet", "Turbojet", etc. The present disclosure describes WFFs in the context of possible worlds semantics wherein a world comprises the specification of a domain value for each one of the equality predicates. In addition, a world comprises a specification as to whether each Boolean predicate (e.g., $B_i$) or the negation thereof (e.g., Not($B_i$)) is true. For example, if:

P1=EngineType with Domain{Rocket, Ramjet, Turbojet}, and

B1=HasLiftingBody.

Then, the compound WFF:

And(Or((=EngineType Ramjet), (=EngineType Turbojet)), Not(HasLiftingBody))

represents all of the worlds wherein the vehicle under consideration does not have a lifting body and has an engine that is either a Ramjet or a Turbojet. In another example of the worlds specified by a WFF, the following WFF:

Or((=EngineType Ramjet), (=EngineType Turbojet))

represents all of the worlds wherein the vehicle under consideration has an engine that is either a Ramjet or a Turbojet, regardless of whether or not the vehicle has a lifting body. As discussed above, atomic WFFs and/or compound WFFs may be used in a constraint management system to condition relations. For example, the specific form of a drag equation that may be applied to a vehicle under consideration may be dictated by whether the vehicle has a lifting body or not, on the type of engine (e.g., Rocket, Turbojet, Ramjet, etc.) of the vehicle, and/or on other factors that may be represented the WFF.

Referring to FIG. 1, in Step 302 of the method 300, an input WFF 100 may be initially received in a classical processor 14 (FIG. 23) for attempting to simplify the input WFF 100. Step 304 may include using one or more classical algorithms 16 (FIG. 23) in the classical processor 14 to generate a resultant WFF 104 in conjunctive normal form (CNF) or in disjunctive normal form (DNF) within a predetermined timeout period 306. As is known in the art, simplification or conversion of an input WFF 100 into a resultant WFF using classical algorithms may be focused on satisfiability of Boolean sentences. Such satisfiability may be directed toward determining whether assignments for the variables of a WFF result in the WFF evaluating to true and may include three cases: the WFF is a tautology (i.e., always true), the WFF is a contradiction (i.e., never true), or there are assignments for the variables that result in the WFF being true and other assignments for the variables that result in the WFF being false.

As indicated above, simplification of a WFF using classical algorithms 16 (FIG. 1) can be computationally intensive. In this regard, conversion of an input WFF 100 to a resultant WFF 104 (FIG. 1) in CNF or DNF form 140, 142 (FIG. 6) using classical algorithms 16 can unfortunately result in significant time and memory requirements for performing the conversion. Advantageously, in the method 300 (FIG. 1) disclosed herein, if the classical processor 14 (FIG. 1) fails to generate a resultant WFF 104 using one or more classical algorithms 16 within a predetermined timeout period 306, the input WFF 100 is communicated to a formula processor 18 (FIG. 23). Expiration of the timeout period 306 may result in the operating system interrupting the classical computational process and passing control from the classical processor 14 to the formula processor 18 (FIG. 23). The formula processor 18 may then convert the input WFF 100 into an initial bit array 200, simplify the initial bit array 200, and convert the simplified bit array 212 into a return WFF 138, as described below.

More specifically, in FIG. 1, Step 302 of the method 300 may include receiving the input WFF 100 at the formula processor 18 (FIG. 23). As shown in FIG. 23, the formula processor 18 may include a formula convertor 20, a bit array simplifier 22, and/or a bit array convertor 24. Step 308 of the method 300 of FIG. 1 may include converting the input WFF 100 into an initial bit array 200 using the formula converter 20. As described in greater detail below, conversion of the input WFF 100 into an initial bit array 200 may comprise generating a world true array 214 (FIG. 2A) or a world false array 216 (FIG. 2A) for the respective cases where the input WFF 100 is an atomic true WFF 148 (FIG. 2A) or an atomic false WFF 150 (FIG. 2A). For other types of WFFs, conversion of the input WFF 100 into an initial bit array 200 may include determining the dimension, predicates, and domains required in the initial bit array 200 and then retrieving the appropriate initial bit array 200 from an array cache 30, or constructing an initial bit array 200 if a search of the array cache 30 fails to uncover an initial bit array 200 of the correct configuration.

Figure 11:
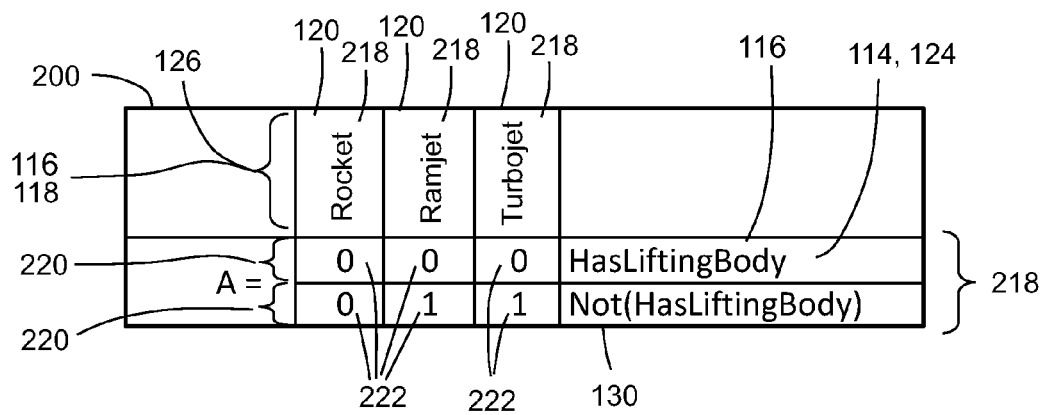
FIG. 11 is an illustration of an embodiment of an initial bit array that may be generated using the system and method disclosed herein and wherein the initial bit array may correspond to an input WFF involving a Boolean predicate and an equality predicate and representing two (2) of six (6) possible worlds associated therewith.

Referring to FIG. 11 to describe a bit array as disclosed herein, shown is an example of an embodiment of an initial bit array 200. In the present disclosure, a bit array may be defined as an array having bit elements 222 that have a value of either "1" or "0". In addition, a bit array may include any number of dimensions. Each dimension can have a different size. For Boolean predicates 124, the size of the corresponding bit array dimension is 2. For equality predicates 126, the size of the bit array dimension equals the length of the domain. In the present disclosure, a logic bit array may be defined as a bit array including a mapping of each dimension of the bit array to a list of the predicates (e.g., Boolean and/or equality) included in the bit array. As was earlier indicated, an input WFF 100 (FIG. 1) may be represented by an initial bit array 200. In the present disclosure, an initial bit array 200 may be described using the semantics that if $A[i, j, k \ldots ]=1$ (e.g., the bit element value), then the world where the values for the Boolean predicates and equality predicates are represented by the $(i, j, k, \ldots )$ of the array is true.

An example of an initial bit array 200 is shown in FIG. 11, which represents a logic bit array family including the Boolean predicate B1 (HasLiftingBody) (reference number 124) and the equality predicate P1 (EngineType) (reference number 126) over the domain {Rocket, Ramjet, Turbojet} (reference number 118) wherein Rocket, Ramjet, Turbojet are domain elements 120 of the domain 118 of the equality predicate P1. Based upon the above-mentioned semantics, the initial bit array 200 may be represented by the following:

A[1, 1]: HasLiftingBody And EngineType=Rocket
A[2, 1]: Not(HasLiftingBody) And EngineType=Rocket
A[1, 2]: HasLiftingBody And EngineType=Ramjet
A[2, 2]: Not(HasLiftingBody) And EngineType=Ramjet
A[1, 3]: HasLiftingBody And EngineType=Turbojet
A[2, 3]: Not(HasLiftingBody) And EngineType=Turbojet wherein each bit element value (e.g., 1 or 0) (reference number 222) in the initial bit array 200 corresponds to a specification of the six (6) possible worlds for the Boolean predicate (HasLiftingBody) and the equality predicate (EngineType) over the domain {Rocket, Ramjet, Turbojet}.

In FIG. 11, the following input WFF 100 specifies two (2) of the six (6) possible worlds corresponding to the initial bit array 200:

And(Or((=EngineType Ramjet), (=EngineType Turbojet)), Not(HasLiftingBody))

Figure 12:
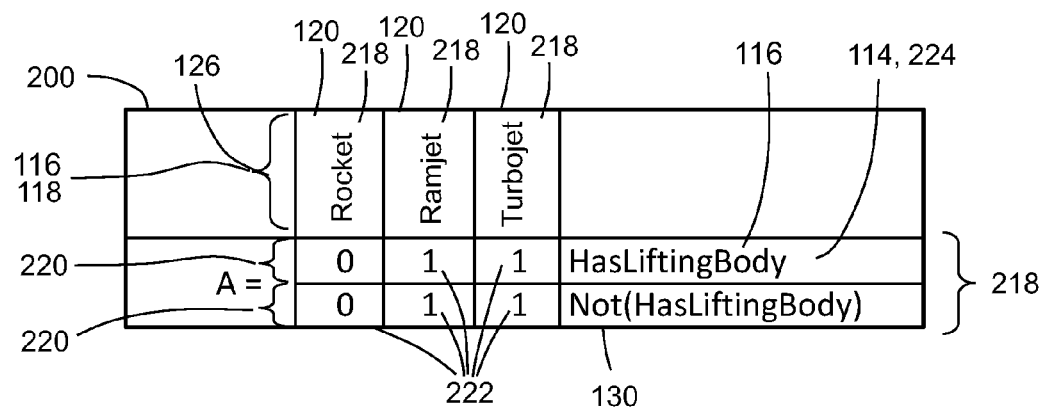
FIG. 12 is an illustration of a further embodiment of an initial bit array corresponding to an input WFF representing four (4) of six (6) possible worlds associated with the Boolean predicate and the domain elements associated with the equality predicate.

In FIG. 12, the following input WFF 100 specifies four (4) of the six (6) possible worlds corresponding to the initial bit array 200:

Or((=EngineType Ramjet), (=EngineType Turbojet))

As may be appreciated, the initial bit arrays 200 illustrated in FIGS. 11 and 12 are non-limiting embodiments of initial bit arrays 200 for representing input WFFs 100. In the present disclosure, input WFFs 100 may be represented by initial bit arrays 200 having any number of dimensions and wherein the domain 118 may be of finite length.

Referring to FIGS. 2A-2B of the method 100 disclosed herein, shown are one or more operations that may be included in Step of 308 for converting the input WFF 100 into an initial bit array 200. The above noted operations may be recursively performed on an input WFF 100 wherein an initial bit array 200 may be constructed and a list of predicates 114 (FIG. 11-12) may be generated in the order that the predicates 114 appear in the initial bit array 200. For example, for the initial bit arrays 200 illustrated in FIGS. 11 and 12, the predicate list 116 may be represented by the following:

1. EngineType
2. HasLiftingBody

Each predicate 114 in the predicate list 116 has a domain 118 associated therewith. For example, the equality predicate 126 (EngineType) includes domain elements 120 {Rocket, Ramjet, Turbojet}. The Boolean predicate 124 (HasLiftingBody) includes domain elements 120 {True, False}. The present disclosure may include one or more routines or functions to facilitate the construction of the initial bit arrays 200 and the generation of the predicate lists 116 associated therewith. Such routines may be written into the programming instructions for the method 300 (FIG. 1) and/or the routines may be included in the underlying programming language. The following comprises a brief description of one or more of the routines or functions that may be included in the system 10 (FIG. 23) and method 300 (FIG. 1) to facilitate conversion of input WFFs 100 to initial bit arrays 200.

The function "Operator(WFF)" is configured to return a top level operator for any input WFF. Such operator is either null, empty set, nil (or equivalent) for True (T) and False (nil) predicates, the Boolean predicate itself for Boolean predicates, =(the equality operator) for an equality predicate, and the conjunction, disjunction, or negation operator (respectively, And, Or, or Not) for compound WFFs.

The function "Arg1(WFF)" is configured to return a first element in a list of arguments or operands in an input WFF. Such argument or operand is nil for True, False and Boolean predicates, the predicate used in an equality predicate, and the first WFF (e.g., the first operand) following an And, Or, or Not operator, or nil if there is none.

The function "Arg2(WFF)" is configured to return the second element in the list of arguments or operands in an input WFF. Such argument or operand is nil for True, False and Boolean predicates, the domain value for an equality predicate, and the second WFF (e.g., the second operand) following an And, Or, or Not operator, or nil if there is none.

The function "Position(item, list)" is configured to return, for any list, the index into the list of the first occurrence of the item. In this regard, "Position(item, list)" returns the position of an item in a list. For example, Position(d, {a, b, c, d, e, f})=4.

The function "Element(list, index)" is configured to return, for any list, the indexed item in the list. In this regard, Element (list, index) returns the value or the identity of the item having the list position as determined by "Position(item, list)". For example, Index({a, b, c, d, e, f}, 4)=d.

Additional routines or functions may be included in an implementation of the programming language for performing the system and method.

For example, the function "BitNot (array)" may be provided to return an initial bit array wherein each bit element is flipped from 1 to 0 and from 0 to 1.

In the function "BitAnd(array1, array2)", the input arrays, array1 and array2, are required to have the same dimensions. The "BitAnd(array1, array2)" function returns an array of the same dimension and with bit elements that are equal to the "AND" (i.e., the conjunction) of the bit elements of the individual initial bit arrays. For example, AND (1, 1)=1, AND (1, 0)=AND (0,1)=AND (0,0)=0.

In the function "BitOr(array1, array2)", the input arrays, array1 and array2, are required to have the same dimensions similar to that which is required for the function "BitAnd (array1, array2)". The "BitOr(array1, array2)" function returns an array of the same dimension and with bit elements that are equal to the "OR" of the bit elements of the individual initial bit arrays. For example, OR(1, 1)=OR (1, 0)=OR (0,1)= 1, OR (0,0)=0.

The function "SetBit(array, indices, value)" sets the bit element of "array" indexed by the list of entries in "indices" to "value", which is either 0 or 1. For example, for a 2 by 3 initial bit array, "SetBit(array, (2,1), 1)" sets the value of the bit element (e.g., reference numeral 222 in FIGS. 11-12) in the second row and the first column of "array" to 1.

Shown in FIGS. 2A-2B is Step 308 for converting an input WFF 100 into an initial bit array 200. Step 308 dispatches the processing of the input WFF 100 depending upon the type of the input WFF 100. Input WFFs 100 may include atomic true or atomic false WFFs 108, atomic Boolean predicate WFFs 124, atomic equality predicate WFFs 126, negation WFFs 130 involving the negation operator (NOT), and compound WFFs 136 involving the conjunction and disjunction operators AND or OR 132, 134 (FIG. 2B). Step 308 of the method includes Step 316 which determines the predicates 114 in the input WFF 100, Step 318 which determines domain elements 120 associated with each one of the predicates 114, and Step 320 which determines bit array dimensions 218 (FIG. 11) of the initial bit array 200. Step 322 of the method comprises processing (e.g., recursively) the input WFF 100 by calling an internal program (e.g., "WFF_to_array_internal") and returning 309 the initial bit array 200 having the bit array dimensions 218, the predicates 114, and the domain elements 118, 120 associated with the input WFF 100. FIG. 13 is a pseudo-code listing 248 of the top level method for converting an input WFF 100 into an initial bit array 200 and corresponding to the operations associated with Step 308 (FIGS. 2A-2B).

Referring briefly to FIG. 14, shown is a pseudo-code listing 250 of the above-mentioned internal program "WFF_to_array_internal" for recursively processing the input WFF 100 into the initial bit array 200 in the manner illustrated in FIGS. 2A-2B. In general, the internal program "WFF_to_array_internal" initially considers cases in which the input WFF 100 is an atomic WFF 106 and which may include atomic true or false 108, a Boolean predicate 124, an equality predicate 126, or a compound WFF 136 as shown in FIGS. 2A-2B. For atomic WFFs 108 that are atomic true 148 or atomic false 150, Step 324 of the method returns a respective world true array 214 or a world false array 216. The pseudo-code listing 250 in FIG. 14 illustrates the conversion of the atomic true or atomic false WFFs 148, 150 to a world true array 214 and a world false array 216, as shown in item 1a and item 1b, respectively.

In FIGS. 2A-2B, for cases where the input WFF 100 is an atomic WFF 106 comprising a single Boolean predicate 124, Step 326 converts the single Boolean predicate 124 to an equality predicate 126 as shown in item 1c of the pseudo-code listing 250 of FIG. 14. The method then recursively processes the predicate in Step 322 to convert the input WFF 100 to an initial bit array 200. If the input WFF 100 is an atomic equality predicate 126, the input WFF 100 is processed in the above-described Steps 316, 318, 320 to determine the bit array dimensions 218 and the predicates 114 and the domain elements 120 associated therewith. Step 328 further includes retrieving, from an array cache 30 (FIG. 3), an initial bit array 200 having the bit array dimensions 218 (FIG. 11), the predicates 114, and the domain elements 120 that are associated with the equality predicate 126. Step 328 may include Step 330 of constructing the initial bit array 200 in an absence of retrieving (e.g., inability to locate) the initial bit array 200 in the array cache 30 as described in greater detail below. As shown in item 2a of the pseudo-code listing 250 of FIG. 14, the internal program "WFF_to_array_internal" searches in the array cache 30 for an initial bit array 200 having the given predicate, domain elements, and the bit array dimensions and, failing to locate the initial bit array in the array cache 30 (FIG. 3), constructs the initial bit array 200 by the method illustrated in FIG. 4 described below.

In FIGS. 2A-2B, for cases where the input WFF 100 is a compound WFF 136 comprising zero or more of the atomic WFFs 106 or a plurality of compound WFFs 136 associated with either a disjunction operator (OR) or a conjunction operator (AND), or, exactly one atomic WFF 106 or a compound WFF 136 associated with a negation operator, Step 322 of the method first recursively processes each operand of the compound WFF 136. In this regard, Step 322 recursively processes the compound WFFs associated with the operator until atomic WFFs 106 are encountered. The method combines the recursively processed WFFs according to whether the operator of the compound WFF 136 is a negation operator (NOT) 130 (FIG. 2A), a conjunction operator (AND) 132

(FIG. 2B), or a disjunction operator (OR) 134 (FIG. 2B). The method returns an initial bit array 200 for each one of the atomic WFFs 106 recursively processed. The combined initial bit array 200 may be processed such that the bit array dimensions 218 thereof are equal to the bit array dimensions 218 (FIG. 11) of the individual initial bit arrays 200.

For example, in FIG. 2A, Step 334 comprises determining the operator type. If the operator is a negation operator 130, the method determines whether the WFF is a Boolean predicate 124. If the WFF is a Boolean predicate 124, the method includes performing Step 316 of determining the predicates 114, the domain elements 120, and the bit array dimensions 218 of the initial bit array 200 in respective Steps 316, 318, 320. The method then performs Step 328 of retrieving an appropriately-configured initial bit array 200 if available from the array cache 30 (FIG. 3), or, if unavailable from the array cache 30, performing Step 330 to construct the initial bit array 200 as described above. In FIG. 2A, if the WFF is not a Boolean predicate 124, Step 322 of the method recursively processes the compound WFF 136 and in Step 336, negates the resulting initial bit array 200 by flipping (not shown) the value of each bit element from 1 to 0 and from 0 to 1. Item 2b of the pseudo-code listing 250 of FIG. 14 illustrates the processing of negated compound WFF 136 cases.

Referring to FIG. 2B, for non-negated compound WFF 136 cases where the operator is a conjunction operator 132 (e.g., AND) or a disjunction operator 134 (e.g., OR), the method includes Step 338 of determining the quantity of operands 102 in the combined initial bit arrays 200. For a conjunction operator 132, Step 340 includes combining the bit elements 222 of the individual initial bit arrays 200 in a manner such that the bit elements 222 are equal to the conjunction (the "AND") of the individual initial bit arrays 200. For a disjunction operator 134, Step 342 includes combining the bit elements 222 of the individual initial bit arrays 200 in a manner such that the bit elements 222 are equal to the disjunction (the "OR") of the individual initial bit arrays 200. Step 344 comprises returning an error if none of the above cases is valid in FIGS. 2A-2B. FIG. 14 illustrates in item 2c the pseudo-code for processing non-negated compound WFF 136 cases where the operator is a conjunction operator 132 (e.g., AND) or a disjunction operator 134 (e.g., OR). For negated compound WFFs and for non-negated compound WFFs, the internal program "WFF_to_array_internal" recursively calls itself on the top level clauses of the compound WFF 136 and combines the results (i.e., the initial bit arrays 200) using the appropriate combining function ("BitNot", "BitOr", or "BitAnd").

Referring to FIG. 3, shown are the operations that may be included in Step 328 for retrieving, from the array cache 30, an initial bit array 200 having the given bit array dimensions 218, the predicates 114, and the domain elements 120 associated with the equality predicate 126 (FIG. 2A) as described above. Step 346 may include searching for the initial bit array 200 in the array cache 30. Shown in FIG. 15 is a pseudo-code listing 252 of a routine "GetLeafWffArray" that searches in the array cache 30 for an initial bit array 200 having the given predicate 114, domain elements, and the bit array dimensions, and either retrieving the initial bit array 200 from the array cache 30 as shown in the flow diagram of FIG. 3, or constructing the initial bit array 200 as shown in the flow diagram of FIG. 4.

FIG. 4 illustrates the operations that may be included in Step 330 for constructing the initial bit array 200. Step 348 may include creating the initial bit array 200 using top level predicate-domains of the input WFF 100 (FIG. 1) with corresponding bit array dimensions 218 (FIG. 11). Step 350 may comprise setting all bit elements 222 to "0" for the initial bit array 200. Step 352 may comprise setting all bit elements 222 to "1" along the predicate index (e.g., the bit array dimension) and the value index (e.g., the offset of the value in the predicate domain). The method in FIG. 4 returns an appropriately-configured initial bit array 200. The method constructs the initial bit array 200 with the given bit array dimensions 218 and having bit element 222 values (e.g., 1s and 0s) that correspond to the worlds specified by "pred_index" and "value_index" as shown in the pseudo-code listing 252 of FIG. 15. In an embodiment, the constructed initial bit array 200 (FIG. 4) may be added to the array cache 30 (FIG. 4) as performed by Step 332 (FIG. 2B). Advantageously, memory requirements for the method may be reduced by adding newly-constructed initial bit arrays 200 to the collection of previously-constructed initial bit arrays 200 stored in the array cache 30.

Step 352 of FIG. 4 may be represented by the pseudo-code listing 254 shown in FIG. 17 illustrating a routine for setting to "1" the bit elements 222 of an initial bit array 200 during construction thereof. As described above, a value of "1" for a bit element 222 of "bit_array" corresponds to all of the worlds that are associated with the predicate related to "set_dimension" and the domain elements of that predicate related to index. For example, referring to FIG. 16, for predicates={HasLiftingBody, EngineType} with domains, Domain (HasLiftingBody)={"TRUE", "FALSE"}, Domain (EngineType)={Rocket, Ramjet, Turbojet}, it may be desirable to set the elements of a bit array corresponding to the atomic WFF, EngineType=Turbojet. The process for setting to "1" the values of the bit elements 222 of a representative initial bit array 200 include calling the function "SetArrayDimensionIndex" on a "bit_array" with initial "0" values for the bit elements 222 with the following arguments: "set_dimension" equal to 2 (i.e., corresponding to the second predicate in the predicate list), index equal to 3 (i.e., corresponding to the third domain element in the predicate's domain), dimensions equal to {2, 3}, "current_dimension" equal to 1, and indices equal to the empty list. In FIG. 17, the above-described process for assigning "1" values to the initial bit array 200 is initiated by starting with the value of "current_dimension", and recursively incrementing the value of "current_dimension" along with index to set the appropriate values for the input bit array. In this manner, the values in the initial bit array 200 correspond to the worlds specified by the variable indices which, in each recursive call, are added to a growing list of indices that represents a world that is represented by the input WFF in the calling program.

Figure 5:
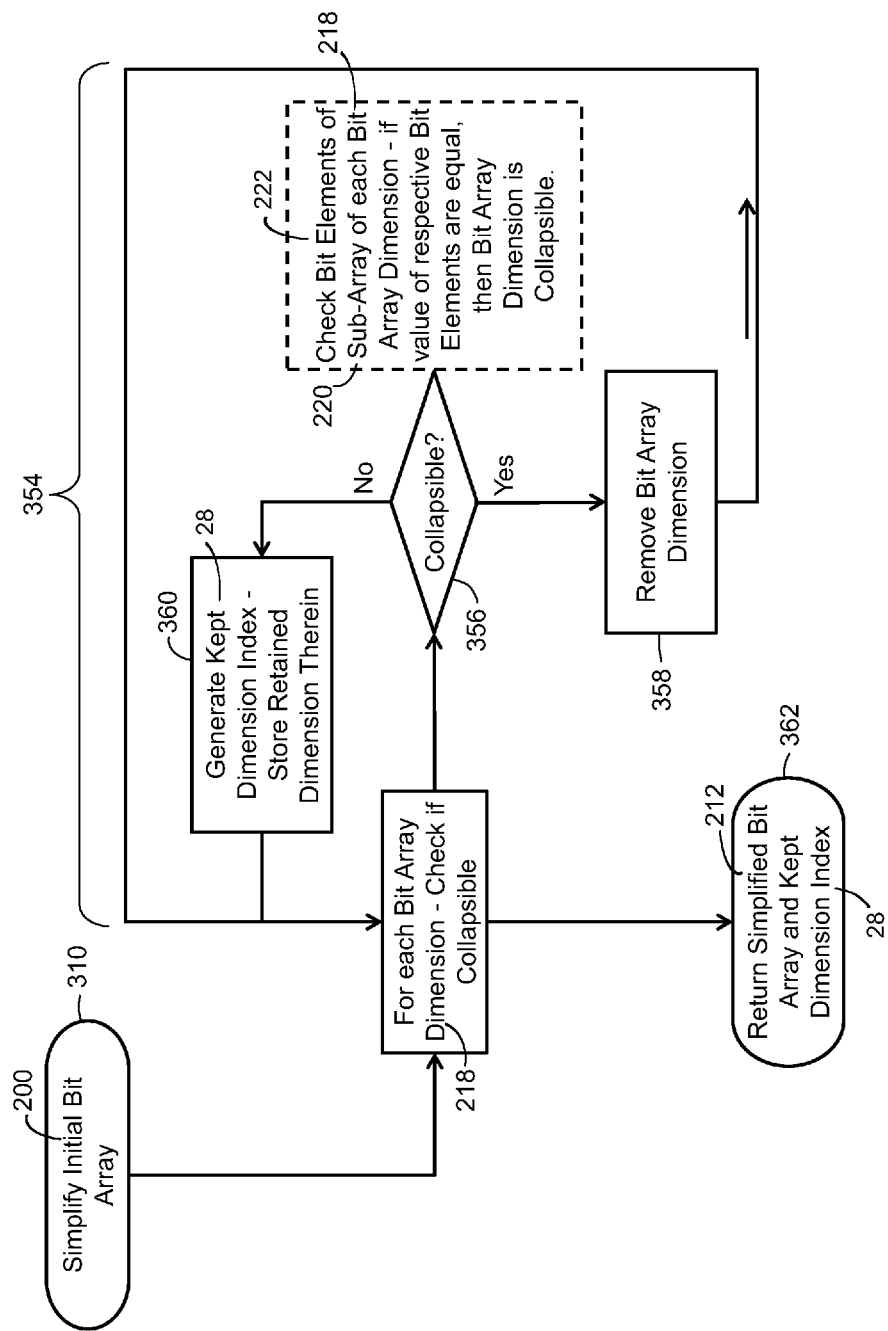
FIG. 5 is a flow diagram illustrating one or more operations that may be included in a method for simplifying an initial bit array.

Referring to FIG. 5, shown are the operations that may be included in Step 310 for simplifying the initial bit array 200. The initial bit array 200 may include a plurality of bit array dimensions 218 associated with the predicates 114. As indicated above, Step 310 removes predicates 114 (FIGS. 11-12) that are not necessary to represent the input WFF 100 (FIG. 1) being modeled and returns a simplified bit array 212. As shown in FIG. 5, Step 354 generally comprises collapsing the initial bit array 200 by removing semantically redundant bit array dimensions 218. The method may include Step 356 of comparing the bit elements 222 (FIG. 2B) of the sub-arrays 220 for each one of the bit array dimensions 218 to determine if a bit array dimension 218 is collapsible. If the bit elements 222 of the sub-arrays 220 are equal, then the dimension associated with the sub-array 220 can be removed. Step 358 may include removing from the initial bit array 200 each bit array dimension 218 having sub-arrays 220 with equal bit elements 222 such that predicates 114 that are not necessary to represent the input WFF 100 are removed from the simplified bit array 212. Step 360 may comprise generating a kept dimension index 28 (FIG. 3) comprising bit array dimensions 218 that are not removed from the initial bit array 200 Step 362 may comprise returning a simplified bit array 212 and the kept dimension index 28.

Referring now to FIG. 16 to illustrate the bit array simplification, shown is a 2 by 3 bit array corresponding to the following compound WFF:

Or (And(EngineType=Turbojet, HasLiftingBody), And (EngineType=Turbojet, Not(HasLiftingBody))

As can be seen in FIG. 16, the sub-array 220 for the Boolean predicate (HasLiftingBody) has the same bit element 222 values as the sub-array 220 for (Not(HasLiftingBody)). Due to the equivalent bit elements 222, the dimension for the Boolean predicate can be removed such that the bit array illustrated in FIG. 16 is logically equivalent to the following WFF:

EngineType=Turbojet which corresponds to the one-dimensional simplified bit array 212 illustrated in FIG. 18.

In FIG. 19, shown is a pseudo-code listing 256 of a routine "SimplifyArray" for removing dimensions from an initial bit array 200 (FIG. 5) and returning a simplified bit array 212 (FIG. 5). The "SimplifyArray" routine traverses the initial bit array 200 searching for dimensions where the sub-arrays 220 (FIG. 5) for each index in a given dimension are equal to each other. The "SimplifyArray" routine removes such dimensions and records those dimensions that are not removed such that the calling program can construct a predicate list 116 (FIG. 11) for the simplified bit array 212 using the predicate list 116 of the initial bit array 200. The routine illustrated in FIG. 19 is one of many recursive routines that may be implemented for collapsing an initial bit array 200 by removing one or more dimensions. In FIG. 19, the arguments presented in brackets for "SimplifyArray" are optional and may be used during recursive calls to the routine. The "SimplifyArray" routine may include a function "dimension-slice" for checking the collapsibility of initial bit array along an axis. If the initial bit array is collapsible, then the routine may return the collapsed array and True as multiple values. If the initial bit array is not collapsible, the routine will return the input bit-array and False as multiple values. As indicated above, collapsing the initial bit array facilitates the simplification of the input WFF 100 represented by the initial bit array.

Testing for the collapsibility of an initial bit array 200 may be performed in one of several ways and may be described using the following notation for arrays as incorporated into MATLAB programming language. In MATLAB syntax, the ":" entry for a particular axis dimension refers to all values for such axis. For example, if A is a 2 by 3 matrix, then A[2, :] refers to a second row of the matrix A[2, :]=(A[2,1], A[2,2], A[2,3]). In order to test whether the k'th axis of an array is collapsible, the routine "CollapseIfPossible" of the present disclosure tests the following:

A[:, . . . , :, j, :, . . . , :]=A[:, . . . , :, 1, :, . . . , :]

for j=2, . . . , J, the length of the k'th axis and where the subscript j is at position k in the above. If the above is true, the routine returns the collapsed array B[:, . . . , :]= A[:, . . . , :, 1, :, . . . , :] where the array B has one less dimension than A by removing the k'th axis. The actual implementation of the "CollapseIfPossible" routine uses row-major subscripting access to a hypothetical B array which is only created if needed and additionally uses a mapping from such subscripts to the actual "1s" in A. Row-major subscripts allow one to treat a multi-dimension array as though it were singly-dimensioned. For example, given an n-rank array, A, with dimensions d[1]×d[2]× . . . ×d[n], if k is the row-major subscript into A, i.e. A[k]=A[i[1], . . . , i[n]], then:

k=(i[1]−1)*f[1]+ . . . +(i[n]−1)*f[n],
f[1]=d[2]* . . . *d[n]
f[2]=d[3]* . . . *d[n]
f[n−1]=d[n]
f[n]=1

Referring to FIG. 6, shown are one or more operations that may be included in Step 312 for converting a simplified bit array 212 into a return WFF 138 in disjunctive normal form (DNF) 140 or in conjunctive normal form (CNF) 142. The method may include systematically processing the simplified bit array 212 given a set of predicates 114 (FIG. 11) and their respective domain elements 120 (FIG. 11), and constructing a return WFF 138. The method may additionally include Step 364 which may comprise determining a total quantity of the bit elements 222 in the simplified bit array 212. Step 366 may comprise determining a quantity of the bit elements 222 in the simplified bit array 212 having a value of 1. Step 368 may comprise converting the simplified bit array 212 to the return WFF 138 in disjunctive normal form (DNF) 140 if less than one-half of the total quantity of the bit elements 222 has a value of 1. Step 372 may comprise returning the DNF WFF 140. Step 370 may comprise converting the simplified bit array 212 to the return WFF 138 in conjunctive normal form (CNF) 142 if at least one-half of the total quantity of the bit elements 222 have a value of 1. Step 374 may comprise returning the CNF WFF 142.

FIG. 20 illustrates a pseudo-code listing 258 of a routine "ArrayToWff" for converting a simplified bit array 212 (FIG. 6) into a return WFF 138 (FIG. 6) given a set of predicates, "predicates_in", and domain elements, "domains_in", for the predicates. The "ArrayToWff" routine in FIG. 20 initially determines the return WFF 138 in disjunctive normal form (DNF) 140 (FIG. 5) or as the negation of a DNF ("not DNF"). As indicated above in Step 366, the "ArrayToWff" routine may determine the form in which to generate the return WFF 138 by counting the quantity of bit elements 222 (FIG. 6) in the input array having a value of "1". As indicated above in Step 368, if the quantity of "1" bit elements 222 and selecting DNF or not DNF depending on whether the quantity of "1" bit elements 222 is less than one-half of the total quantity of bit elements 222 in the simplified bit array 212.

Figure 7:
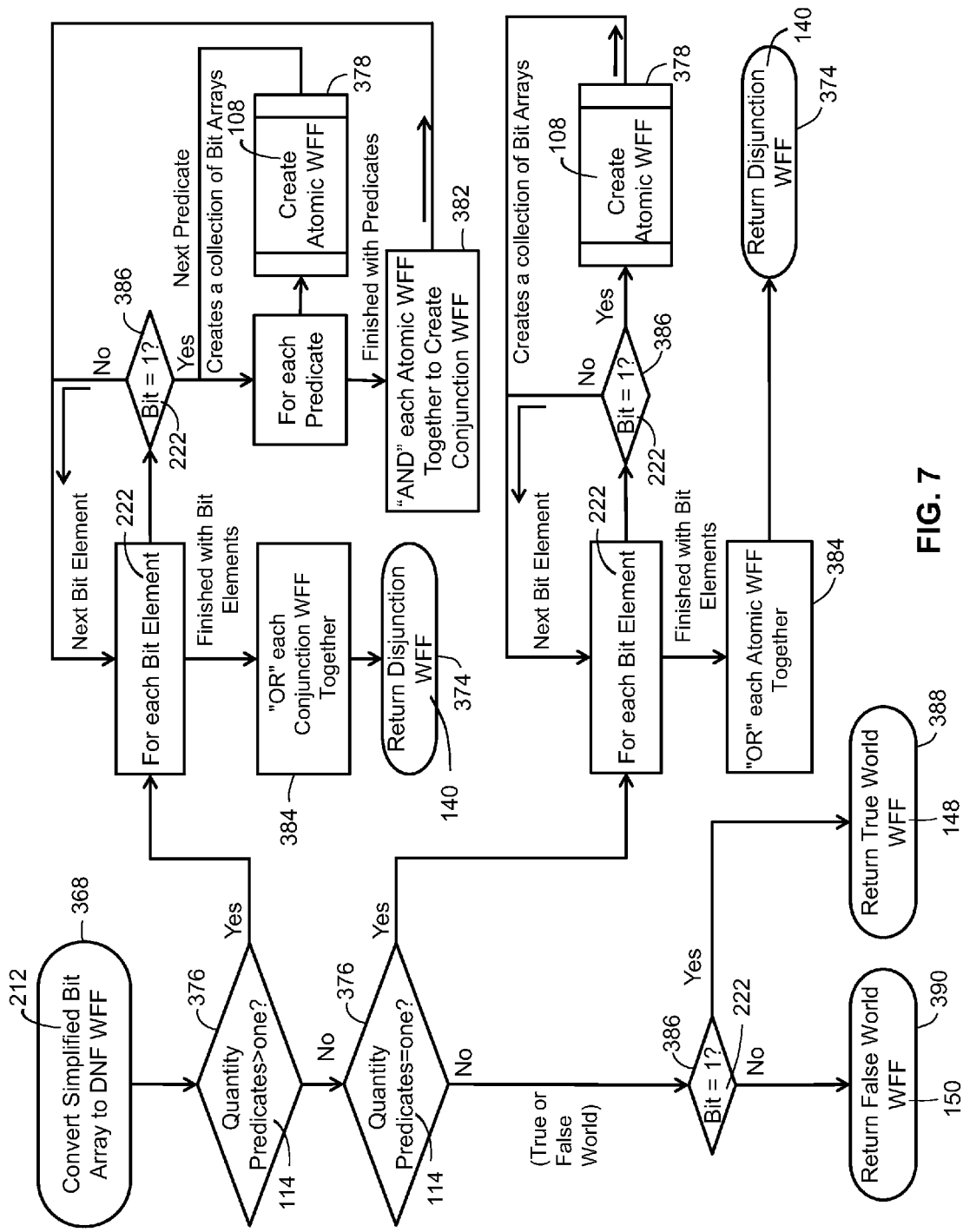
FIG. 7 is a flow diagram illustrating one or more operations that may be included in a method for converting the simplified bit array to a disjunctive normal form (DNF) WFF.

FIG. 7 is an embodiment of a flow diagram of Step 368 for converting the simplified bit array 212 to a disjunctive normal form (DNF) WFF 140. Step 368 may include Step 376 for determining a quantity of the predicates 114 associated with the simplified bit array 212. If the quantity of the predicates 114 is greater than one, the method may include Step 378 for creating an atomic WFF 108 (FIG. 3) for each bit element 222 having a value of 1. The creation of an atomic WFF 108 (FIG. 2A) is performed in Step 378 which is illustrated in FIG. 9 and described in greater detail below. In FIG. 7, Step 382 may include creating a conjunction WFF (e.g., "AND" each atomic WFF together) containing each one of the atomic WFFs 108 created for each bit element 222 having a value of 1. Step 384 may include creating a disjunction WFF (e.g., "OR" each conjunction WFF together) or a DNF WFF 140 containing the conjunction WFF of the atomic WFFs 108.

In FIG. 7, if the quantity of the predicates 114 associated with the simplified bit array 212 is exactly one, the method for converting the simplified bit array 212 to a DNF WFF 140 may include Step 378 comprising creating an atomic WFF 108 for each bit element 222 having a value of 1, and Step 384 comprising creating a disjunction WFF (e.g., "OR" each atomic WFF together) or a DNF WFF 140 containing each one of the atomic WFFs 108 created for each bit element 222 having a value of 1. In FIG. 7, if there are no predicates 114, Step 386 comprises determining the value of the bit element 222 (e.g., a "1" or a "0") and, in Step 388, returning a true world WFF 148 if the bit element 222 has a value of 1. Step 390 comprises returning a false world WFF 150 if the bit element 222 has a value of 0.

Figure 8:
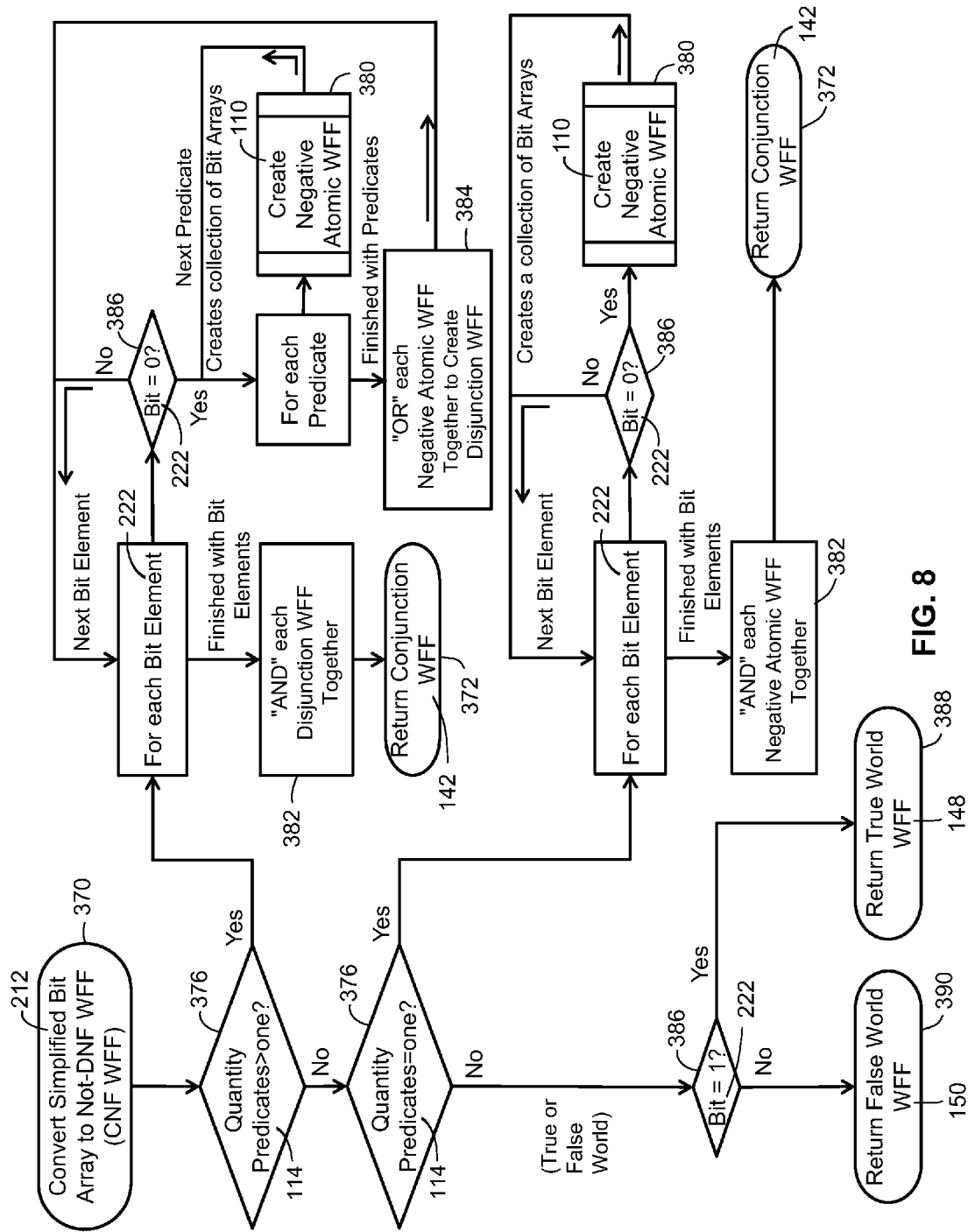
FIG. 8 is a flow diagram illustrating one or more operations that may be included in a method for converting the simplified bit array to a conjunctive normal form (CNF) WFF.

FIG. 8 is an embodiment of a flow diagram for converting the simplified bit array 212 to a conjunctive normal form (CNF) WFF 142. Step 376 of the method may include determining a quantity of the predicates 114 associated with the simplified bit array 212 as described above. If the quantity of the predicates 114 is greater than one, the method may include Step 380 of creating a negative atomic WFF 110 for each bit element 222 having a value of 0. The creation of a negative atomic WFF 110 is illustrated in the flow diagram of FIG. 10 and described in greater detail below. In FIG. 8, Step 384 may include creating a disjunction WFF (e.g., "OR" each negative atomic WFF together) of the negative atomic WFFs 110. Step 382 may include creating a conjunction WFF (e.g., "AND" each disjunction WFF together) or a CNF WFF 142 containing the disjunction WFF of the negative atomic WFFs 110.

In FIG. 8, if the quantity of the predicates 114 associated with the simplified bit array 212 is exactly one, the method for converting the simplified bit array 212 to a CNF WFF 142 may include Step 380 comprising creating a negative atomic WFF 110 for each bit element 222 having a value of 0, and Step 382 comprising creating a conjunction WFF (e.g., "AND" each negative atomic WFF together) or CNF WFF 142 containing each one of the negative atomic WFFs 110 created for each bit element 222 having a value of 0. In FIG. 8, if there are no predicates 114, Step 386 comprises determining the value of the bit element 222 (e.g., "1" or a "0"). Step 388 comprises returning a true world WFF 148 if the bit element 222 has a value of 1. Step 390 comprises returning a false world WFF 150 if the bit element 222 has a value of 0.

FIG. 9 is an embodiment of a flow diagram for Step 378 of creating an atomic WFF 108 (FIG. 7). The method may include Step 392 of determining whether the predicate is a Boolean predicate 124 or an equality predicate 126. If the predicate is an equality predicate 126, Step 394 returns the atomic WFF as "(=Predicate Value)". If the predicate is a Boolean predicate 124, Step 396 comprises determining if the predicate "Value=True". If the predicate Value=True, Step 398 comprises returning the atomic WFF as "(Not predicate)". If the predicate value is not True, Step 400 comprises returning the atomic WFF 108 as the predicate 114 (FIG. 8).

FIG. 10 is an embodiment of a flow diagram for the Step 380 of creating a negative atomic WFF 110. Step 392 may comprise determining whether the predicate is a Boolean predicate 124 or an equality predicate 126. If the predicate is an equality predicate 126, Step 402 comprises determining whether a domain length of the predicate 114 is 2. If the domain length of the predicate 114 (FIG. 8) is not 2, Step 404 returns the negative atomic WFF 110 as "Not(=Predicate Value)". If the domain length of the predicate 114 is 2, Step 406 returns the negative atomic WFF 110 as "(=Predicate [other value])". If the predicate 114 is a Boolean predicate, Step 396 comprises determining if the predicate value=True. If the predicate value=True, Step 398 comprises returning the negative atomic WFF 110 as "(Not predicate)". If the predicate 114 value is not True, Step 400 comprises returning the negative atomic WFF 110 as the predicate 114 (FIG. 8).

FIG. 21 is a pseudo-code listing 260 of a routine "ArrayToDNF" for converting a simplified bit array ("bit array in"), to a return WFF 138 (FIG. 7) in disjunctive normal form (DNF) 140 (FIG. 7) given the applicable predicates and domains, and using the "1" bit elements 222 (FIG. 7) in the simplified bit array 212 (FIG. 7) to represent True states and generate atomic WFFs 108 (FIG. 7). The "ArrayToDNF" routine may initially determine the total quantity of predicates 114 (FIG. 7) to determine whether the simplified bit array 212 is a multi-dimensional array. If so, the simplified bit array 212 is converted into a DNF WFF 140 as a disjunction of a collection of smaller WFFs, each of which is the conjunction of atomic WFFs 108. The generation of the atomic WFFs 108 is based on the domain values for bit element 222 values of zero in the simplified bit array 212. Each one of the atomic WFFs 108 represents the value of each predicate 114 and value at that bit element 222 location in the simplified bit array 212.

Referring briefly to FIG. 11, given a bit element 222 of "1" at index [2, 2] in the two-dimensional bit array, the bit element 222 represents the value corresponding to index 2 in domain values for EngineType, or "Ramjet", and the value corresponding to index 2 in domain values for HasLiftingBody, or "False". The atomic WFF 108 corresponding to such values is the following:

Or(Not(=EngineType Rocket), Not(HasLiftingBody))

The complete WFF for the bit array in FIG. 11 is the following:

Or(And((=EngineType Ramjet), Not(HasLiftingBody)), And((=EngineType Turbojet), Not(HasLiftingBody)))

Given a single predicate, the atomic WFF 108 is created as a disjunction of atomic WFFs 108, one for each "1" value bit element. Each atomic WFF 108 is constructed in the manner described above in the description of FIG. 9. When no predicates 114 are given, the computer-language specific representation of the resulting zero-dimensional bit array may be examined to return either a True World or a False World. In LISP programming language, when the bit array is equal to #0A1, the True World is returned. When the bit array is equal to #0A0 in LISP programming language, the False World is returned.

FIG. 22 is a pseudo-code listing 262 of a routine "ArrayToNotDNF" for converting a simplified bit array ("bit_array_in"), to a return WFF 138 (FIG. 8) in conjunctive normal form (CNF) 142 (FIG. 8) given the applicable predicates and domains, and using the "0" bit elements 222 (FIG. 8) in the simplified bit array 212 (FIG. 8) to represent True states and generate negative atomic WFFs 110 (FIG. 8). As indicated above, the "ArrayToNotDNF" routine may initially determine the total quantity of predicates 114 (FIG. 8) to determine whether the simplified bit array 212 is a multi-dimensional array. If so, the simplified bit array 212 is converted into a CNF WFF 142 (FIG. 8) as a conjunction of a collection of smaller WFFs, each of which is the disjunction of negative atomic WFFs 110. The generation of the negative atomic WFFs 110 is based on the domain values for bit element 222 values of zero in the simplified bit array 212.

Referring to FIG. 12, given a bit element 222 of "0" at index [1,1] which represents the value corresponding to index 1 in domain values for EngineType, or "Rocket", and the value corresponding to index 1 in domain values for HasLiftingBody, or "True". The atomic WFF 108 corresponding to such values is the following:

Or(Not(=EngineType Rocket), Not(HasLiftingBody))

The complete WFF for the bit array in FIG. 12 is the following:

And(Or(Not(=EngineType Rocket), Not(HasLiftingBody)), Or(Not(=EngineType Rocket), HasLiftingBody))

For a single predicate, the WFF is built as a conjunction of negative atomic WFFs 110 comprising one negative atomic WFF 110 for each "0" bit element. If no predicates 114 are given, the computer-language specific representation of the resulting zero-dimensional bit array is examined to return either the True World or False World in the same as is discussed above with regard to FIG. 11.

Referring to FIG. 23, shown is a block diagram of a system for implementing the above-described steps of the disclosed method or any combination of the steps, in whole or in part, in a computer-implemented process such as on a processor-based system 10 or other suitable computer system. The processor-based system 10 (FIG. 23) may implement one or more of the above-described steps during simplification of WFFs for supporting rapid design constraint formula computation or any application requiring manipulation of propositional logic formulae. The processor-based system 10 may perform computer readable program instructions 72 which may be provided to or loaded onto the processor-based system 10 in order to implement one or more of the above-described operations or steps. In a non-limiting example, the processor-based system 10 and/or the computer readable program instructions 72 may facilitate the simplification of a well-formed formula (WFF) such as for use in a constraint management system 12 (FIG. 23).

The block diagram of FIG. 23 illustrates the processor-based system 10 in an advantageous embodiment that may convert an input WFF 100 (FIG. 1) into an initial bit array 200 (FIG. 1) representation of the input WFF 100, simplify the initial bit array 200 to remove predicates 114 (FIG. 1) not necessary to represent the input WFF 100, and convert the simplified bit array 212 into a return WFF 138 (FIG. 1) in minimum canonical form (i.e., DNF or CNF). In the embodiment illustrated in FIG. 23, the processor-based system 10 may include a data communication path 50 (e.g., data link) communicatively coupled to one or more components to facilitate transfer of data between such components. The communication path 50 may comprise one or more data buses or any other suitable communication path that facilitates the transfer of data between the components and devices of the processor-based system 10.

In a non-limiting embodiment, the components may include one or more of a processor 52, a memory device 54, a non-volatile storage device 56, a communications device 60, an input/output device 58, and a display device 62 (FIG. 23). The system may further include a classical processor 14 and a formula processor 18. The formula processor 18 may include a formula converter 20, a bit array simplifier 22, a bit array converter 24, a bit array constructor 26, an array cache 30, and a kept dimension index 28. As indicated above, the classical processor 14 may be configured to attempt a simplification of the input WFF 100 using one or more classical algorithms 16 (FIG. 1) within a predetermined timeout period 306 (FIG. 1). The classical processor 14 may be configured to communicate the resultant WFF 104 or an absence thereof to the formula processor 18.

The formula processor 18 may be configured to convert an input WFF 100 (FIG. 1) into an initial bit array 200 (FIG. 1). The formula converter 20 may be configured to determine the predicates 114 (FIG. 2A) in the input WFF 100, determine domain elements 120 (FIG. 2A) associated with each one of the predicates 114, and determine bit array dimensions 218 (FIG. 2A) of the initial bit array 200 corresponding to the predicates 114 and the domain elements 120. In this regard, the formula converter 20 may be configured to convert an atomic WFF 108 into an initial bit array 200 comprising one of a world true array 214 (FIG. 2A) and a world false array 216 (FIG. 2A). The formula converter 20 may additionally be configured to determine the bit array dimensions 218 of the initial bit array 200 and the predicates 114 and the domain elements 120 associated with the Boolean predicate 124 and retrieve, from the array cache 30 (FIG. 3), an initial bit array 200 representing the Boolean predicate 124. The bit array constructor 26 may construct the initial bit array 200 if a search of the array cache 30 fails to uncover the initial bit array 200 having the appropriate configuration. The formula converter 20 may additionally be configured to return an initial bit array 200 for each one of the atomic WFFs 106 (FIG. 2A), and combine the initial bit arrays 200 based upon at least one of a negation operator 130 (FIG. 2A), a conjunction operator 132 (FIG. 2B), and a disjunction operator 134 (FIG. 2B).

The bit array simplifier 22 may simplify the initial bit array 200 by removing predicates 114 (FIG. 5) that are not necessary to represent the input WFF 100 (FIG. 1) being modeled. In this regard, the bit array simplifier 22 may be configured to collapse the initial bit array 200 by removing at least one of the bit array dimensions 218 (FIG. 5). The bit array simplifier 22 may additionally be configured to compare the bit elements 222 of the sub-arrays 220 for each one of the bit array dimensions 218 and remove from the initial bit array 200 each bit array dimension 218 having sub-arrays 220 (FIG. 5) with equal bit elements 222 (FIG. 5). In addition, the bit array simplifier 22 may generate a kept dimension index 28 (FIG. 5) comprising bit array dimensions 218 not removed from the initial bit array 200.

The bit array converter 24 may convert the simplified bit array 212 (FIG. 6) into a return WFF 138 (FIG. 6) in disjunctive normal form (DNF) 140 (FIG. 6) or in conjunctive normal form (CNF) 142 (FIG. 6). In an embodiment, the bit array converter 24 may determine a quantity of bit elements 222 in the simplified bit array 212 having a value of 1 relative to a total quantity of the bit elements 222 (FIG. 6) in the simplified bit array 212. The bit array converter 24 may convert the simplified bit array 212 to the return WFF 138 (FIG. 6) in DNF form 140 (FIG. 6) if less than one-half of the total quantity of bit elements 222 have a value of 1. Alternatively, the bit array converter 24 may convert the simplified bit array 212 to the return WFF 138 (FIG. 6) in CNF form 142 (FIG. 6) if at least one-half of the total quantity of bit elements 222 have a value of 1. The bit array converter 24 may be configured to perform one or more of the operations illustrated in FIGS. 6-10 and/or in FIGS. 21-22 and described above.

Referring still to FIG. 23, the results of any one of the above-described steps of converting an input WFF 100 (FIG. 1) into an initial bit array 200 (FIG. 1) representation of the input WFF 100, simplifying the initial bit array 200 to remove predicates 114 (FIG. 1), and converting the simplified bit array 212 into a return WFF 138 (FIG. 1) may be transmitted to the input/output device 58. The input/output device 58 may be communicatively coupled to the display device 62 which may be configured to display the results of the WFF conversion and simplification process. The display device 62 may be configured to display the progress and/or results of an implementation of the WFF conversion and simplification process. In addition, the display device 62 may be configured to display the results of a trade study implemented in a data-dependent constraint management system 12 (FIG. 23).

In an embodiment, the processor-based system 10 may include one or more of the processors 52 for executing instructions of computer readable program instructions 72 that may be installed into the memory device 54. Alternatively, the processor 52 may comprise a multi-processor core having two or more integrated processors cores. Even further, the processor 52 may comprise a main processor and one or more secondary processors integrated on a chip. The processor 52 may also comprise a many-processor system having a plurality of similarly configured processors.

Referring still to FIG. 23, the processor-based system 10 may further include one or more memory devices 54 which may comprise one or more of volatile or non-volatile storage devices 56. However, the memory device 54 may comprise any hardware device such as an array cache 30 for storing data such as the initial bit arrays 200 constructed during the process illustrated in FIG. 4. For example, the memory device 54 may comprise a random access memory or a cache of an interface and/or integrated memory controller hub which may be included in the communication path 50. The memory device 54 may be configured to permanently and/or temporarily store any one of a variety of different types of data, computer readable code or program instructions 72, or any other type of information. The non-volatile storage device 56 may be provided in a variety of configurations including, but not limited to, a flash memory device, a hard drive, an optical disk, a hard disk, a magnetic tape or any other suitable embodiment for long-term storage. In addition, the non-volatile storage device 56 may comprise a removable device such as a removable hard drive.

The processor-based system 10 may additionally include one or more of the input/output devices 58 to facilitate the transfer of data between components that may be connected to the processor-based system 10. The input/output device 58 may be directly and/or indirectly coupled to the processor-based system 10. The input/output device 58 may facilitate user-input by means of a peripheral device such as a keyboard, a mouse, a joystick, a touch screen and any other suitable device for inputting data to the processor-based system 10. The input/output device 58 may further include an output device for transferring data representative of the output of the processor-based system 10. For example the input/output device 58 may comprise a display device 62 such as a computer monitor or computer screen for displaying results of data processed by the processor-based system 10. The input/output device 58 may optionally include a printer or fax machine for printing a hardcopy of information processed by the processor-based system 10.

Referring still to FIG. 23, the processor-based system 10 may include one or more communications devices 60 to facilitate communication of the processor-based system 10 within a computer network and/or with other processor-based systems. Communication of the processor-based system 10 with a computer network or with other processor-based systems may be by wireless means and/or by hardwire connection. For example, the communications device 60 may comprise a network interface controller to enable wireless or cable communication between the processor-based system 10 and a computer network. The communications device 60 may also comprise a modem and/or a network adapter or any one of a variety of alternative device for transmitting and receiving data.

One or more of the operations of the methodology described above for converting and simplifying an input WFF 100 (FIG. 1) into a return WFF 138 (FIG. 1) in minimum canonical form may be performed by the processor 52 and/or by one or more of the formula processor 18, the formula converter 20, the bit array simplifier 22, the bit array converter 24, and the bit array constructor 26 using the computer readable program instructions 72. The computer readable program instructions 72 may comprise program code which may include computer usable program code and computer readable program code. The computer readable program instructions 72 may be read and executed by the processor 52. The computer readable program instructions 72 may enable the processor 52 to perform one or more operations of the above-described embodiments associated with simplifying an input WFF 100 into a return WFF 138.

Referring still to FIG. 23, the computer readable program instructions 72 may include operating instructions for the processor-based system 10 and may further include applications and programs. The computer readable program instructions 72 may be contained and/or loaded onto one or more memory devices 54 and/or non-volatile storage devices 56 for execution by the formula processor 18, the formula converter 20, the bit array simplifier 22, the bit array converter 24, and/or the bit array constructor 26. As indicated above, one or more of the memory devices 54 and/or non-volatile storage devices 56 may be communicatively coupled to one or more of the remaining components illustrated in FIG. 23 through the communication path 50.

The computer readable program instructions 72 may be contained on tangible or non-tangible, transitory or non-transitory computer readable media 66 and which may be loaded onto or transferred to the processor-based system 10 for execution by the processor 52. The computer readable program instructions 72 and the computer readable media 66 comprise a computer program product 64. In an embodiment, the computer readable media 66 may comprise computer readable storage media 68 and/or computer readable signal media 70.

The computer readable storage media 68 may comprise a variety of different embodiments including, but not limited to, optical disks and magnetic disks that may be loaded into a drive, a flash memory device or other storage device or hardware for transfer of data onto a storage device such as a hard drive. The computer readable storage media 68 may be non-removably installed on the processor-based system 10. The computer readable storage media 68 may comprise any suitable storage media and may include, without limitation, a semiconductor system or a propagation medium. In this regard, the computer readable storage media 68 may comprise electronic media, magnetic media, optical media, electromagnetic media, and infrared media. For example, the computer readable storage media 68 may comprise magnetic tape, a computer diskette, random access memory and read-only memory. Non-limiting examples of embodiments of optical disks may include compact disks-read only memory, compact disks-read/write, and digital video disks.

The computer readable signal media 70 may contain the computer readable program instructions 72 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 23, the computer readable signal media 70 may facilitate the downloading of the computer readable program instructions 72 to the non-volatile storage or other suitable storage or memory device for use within processor-based system 10. For example, the computer readable program instructions 72 contained within the computer readable storage media 68 may be downloaded to the processor-based system 10 over a computer network from a server or client computer of another system.

Any one of a variety of different embodiments of the processor-based system 10 may be implemented using any hardware device or system capable of executing the computer readable program instructions 72. For example, the processor 52 may comprise a hardware unit configured for performing one or more particular functions wherein the computer readable program instructions 72 for performing the functions may be pre-loaded into the memory device 54.

In an embodiment, the processor 52 may comprise an application specific integrated circuit (ASIC), a programmable logic device, or any other hardware device configured to perform one or more specific functions or operations. For example, a programmable logic device may be temporarily or permanently programmed to perform one or more of the operations related to the methodology of simplifying an input WFF 100 (FIG. 1) into a return WFF 138 (FIG. 1). The programmable logic device may comprise a programmable logic array, programmable array logic, a field programmable logic array, and a field programmable gate array and any other suitable logic device, without limitation. In an embodiment, the computer readable program instructions 72 may be operated by the one or more processor 52 and/or by other devices including one or more hardware units in communication with the processor 52. Certain portions of the computer readable program instructions 72 may be run be the processor 52 and other portions of the computer readable program instructions 72 may be run by the hardware units.

Advantageously, the system and method disclosed herein for simplifying an input WFF may be implemented in the conditional planning in a data-dependent constraint network as indicated above. In this regard, the system and method disclosed herein for simplifying an input WFF may be implemented in a process for creating a conditional computational plan for computing the values of a user-specified set of output variables from a user-specified set of input variables that are part of a data-dependent constraint network. Advantageously, the process for creating a conditional computational plan avoids the intermixing of planning and computation as is required by traditional conditional planning algorithms. Determination of the computational plan using such a process is relatively rapid with little or no discernable wait time. The time savings may advantageously be used by a designer to explore larger and more complex design spaces during a trade study.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for simplifying a complex well-formed formula (WFF) comprising the steps of:
receiving, in a processor, an input WFF and performing the following:
converting, with a formula converter, the input WFF through a series of recursive steps into an initial bit array, wherein the recursive steps include representing components of an input WFF into corresponding bit arrays and using bit array operations And, Or, and Not corresponding to respective Boolean operations on components of the input WFF to yield the initial bit array representing an entire initial input WFF;
simplifying, with a bit array simplifier, the initial bit array into a simplified bit array by removing predicates from the initial bit array not necessary to represent the input WFF; and
converting, with a bit array converter, the simplified bit array into a return WFF in either a conjunctive normal form or a disjunctive normal form; and
returning, with the processor, the return WFF.

2. The method of claim 1, wherein the step of converting the input WFF through the series of recursive steps into the initial bit array comprises:
determining predicates in the input WFF;
determining domain elements associated with each one of the predicates;
determining bit array dimensions of the initial bit array corresponding to the predicates and the domain elements; and
processing the input WFF to return the initial bit array having the bit array dimensions and the predicates and the domain elements associated therewith.

3. The method of claim 2, wherein the input WFF is an atomic true or atomic false WFF, the step of processing the input WFF to return the initial bit array comprising:
returning, for the atomic true or atomic false WFF, a respective world true array or a world false array.

4. The method of claim 2, wherein the input WFF is an atomic WFF comprising a Boolean predicate or an equality predicate, the step of processing the input WFF to return the initial bit array comprising:
converting, if the atomic WFF is a Boolean predicate, the Boolean predicate to an equality predicate;
determining, for the equality predicate, the bit array dimensions and the predicates and the domain elements associated therewith;
retrieving, from an array cache, an initial bit array having the bit array dimensions, the predicates, and the domain elements associated with the equality predicate; and
constructing the initial bit array in an absence of retrieving the initial bit array from the array cache.

5. The method of claim 4, wherein the input WFF is a compound WFF, the step of processing the input WFF to generate the initial bit array comprising:
recursively processing the compound WFF until atomic WFFs are encountered;
returning an initial bit array for each one of the atomic WFFs recursively processed; and
combining the initial bit arrays based upon at least one of a negation operator, a conjunction operator, and a disjunction operator.

6. The method of claim 1, wherein the initial bit array has a plurality of bit array dimensions associated with the predicates, the step of simplifying the initial bit array comprising:
collapsing the initial bit array by removing semantically redundant bit array dimensions.

7. The method of claim 6, wherein the bit array dimensions comprise sub-arrays having bit elements, the step of collapsing the initial bit array comprising:
comparing the bit elements of the sub-arrays for each one of the bit array dimensions;
removing from the initial bit array each bit array dimension having sub-arrays with equal bit elements;
generating a kept dimension index comprising bit array dimensions not removed from the initial bit array; and
returning a simplified bit array and the kept dimension index.

8. The method of claim 1, wherein the simplified bit array is comprised of bit elements, the step of converting the simplified bit array into the return WFF comprising:
determining a total quantity of the bit elements in the simplified bit array;

determining a quantity of the bit elements in the simplified bit array having a value of 1;
converting the simplified bit array to the WFF in the disjunctive normal form if less than one-half of the total quantity of the bit elements have a value of 1; and
converting the simplified bit array to the return WFF in the conjunctive normal form if at least one-half of the total quantity of the bit elements has a value of 1.

9. The method of claim 1, further comprising the steps of:
processing, in a processor prior to receiving the input WFF in the processor, a resultant WFF within a predetermined timeout period by processing the input WFF using one or more algorithms; and
communicating the resultant WFF or an absence thereof to the processor; and
receiving, in the processor, the input WFF in the absence of the resultant WFF.

10. A method for supporting design constraint formula computation, comprising the steps of:
processing at least one input well-formed formula (WFF) using one or more algorithms to generate a resultant WFF within a predetermined period of time;
communicating the resultant WFF or an absence thereof to a processor; and
receiving, in the processor, the input WFF and performing the following:
converting, with a formula converter, the input WFF through a series of recursive steps into an initial bit array, wherein the recursive steps include representing components of an input WFF into corresponding bit arrays and using bit array operations And, Or, and Not corresponding to respective Boolean operations on components of the input WFF to yield the initial bit array representing an entire initial input WFF;
simplifying, with a bit array simplifier, the initial bit array by removing predicates not necessary to represent the input WFF and resulting a simplified bit array;
converting, with a bit array converter, the simplified bit array into a return WFF in either a conjunctive normal form or a disjunctive normal form; and
returning the return WFF.

11. A processor-based system for supporting design constraint formula computation, comprising:
a formula converter using a processor configured to convert an input well-formed formula (WFF) through a series of recursive steps into an initial bit array, wherein the recursive steps include representing components of an input WFF into corresponding bit arrays and using bit array operations And, Or, and Not corresponding to respective Boolean operations on components of the input WFF to yield the initial bit array representing an entire initial input WFF;
a bit array simplifier configured to simplify the initial bit array into a simplified bit array by removing predicates from the initial bit array not necessary to represent the input WFF; and
a bit array converter configured to convert the simplified bit array into a return WFF in either a conjunctive normal form or a disjunctive normal form.

12. The system of claim 11, wherein:
the formula converter, through the series of recursive steps, is configured to determine the predicates in the input WFF, determine domain elements associated with each one of the predicates, and determine bit array dimensions of the initial bit array corresponding to the predicates and the domain elements.

13. The system of claim 11, wherein:
the input WFF is an atomic true WFF or an atomic false WFF; and
the formula converter being configured to convert the atomic true WFF or the atomic false WFF into an initial bit array of zero dimensions and comprising a respective one of a world true array and a world false array.

14. The system of claim 11, further comprising:
an array cache containing one or more initial bit arrays;
the input WFF comprising a Boolean predicate or an equality predicate; and
the formula converter being configured to convert the Boolean predicate to an equality predicate, determine bit array dimensions and the predicates and domain elements associated with the equality predicate, and retrieve, from the array cache, an initial bit array representing the equality predicate.

15. The system of claim 14, further comprising:
a bit array constructor configured to construct the initial bit array in an absence of the initial bit array in the array cache.

16. The system of claim 11, wherein:
the input WFF is a compound WFF comprising two or more atomic WFFs associated by at least one operator; and
the formula converter being configured to return an initial bit array for each one of the atomic WFFs, and combine the initial bit arrays based upon at least one of a negation operator, a conjunction operator, and a disjunction operator.

17. The system of claim 11, wherein:
the initial bit array has a plurality of bit array dimensions associated with the predicates; and
the bit array simplifier being configured to collapse the initial bit array by removing at least one of the bit array dimensions.

18. The system of claim 17, wherein:
the bit array dimensions include sub-arrays having bit elements; and
the bit array simplifier being configured to compare the bit elements of the sub-arrays for each one of the bit array dimensions and remove from the initial bit array each bit array dimension having sub-arrays with equal bit elements.

19. The system of claim 17, further comprising:
a bit array converter configured to:
determine a quantity of bit elements in the simplified bit array having a value of 1 relative to a total quantity of the bit elements in the simplified bit array;
convert the simplified bit array to the WFF in the disjunctive normal form if less than one-half of the total quantity of the bit elements have a value of 1; and
convert the simplified bit array to the return WFF in the conjunctive normal form if at least one-half of the total quantity of the bit elements has a value of 1.

20. The system of claim 11, further comprising:
a processor configured to receive the input WFF and determine a resultant WFF within a predetermined timeout period using one or more algorithms;
the processor being configured to communicate the resultant WFF or an absence thereof to a processor; and
the processor being configured to receive the input WFF in the absence of receiving the resultant WFF from the processor.

* * * * *